United States Patent
Smith et al.

(10) Patent No.: US 11,996,992 B2
(45) Date of Patent: May 28, 2024

(54) OPPORTUNISTIC PLACEMENT OF COMPUTE IN AN EDGE NETWORK

(71) Applicant: Intel Corporation, Santa Clara, CA (US)

(72) Inventors: Ned M. Smith, Beaverton, OR (US); S M Iftekharul Alam, Hillsboro, OR (US); Satish Chandra Jha, Portland, OR (US); Vesh Raj Sharma Banjade, Portland, OR (US); Christian Maciocco, Portland, OR (US); Kshitij Arun Doshi, Tempe, AZ (US); Francesc Guim bernat, Barcelona (ES); Nageen Himayat, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/851,853

(22) Filed: Jun. 28, 2022

(65) Prior Publication Data
US 2022/0329499 A1   Oct. 13, 2022

(51) Int. Cl.
*H04L 41/16* (2022.01)
*H04L 41/12* (2022.01)
(Continued)

(52) U.S. Cl.
CPC .......... *H04L 41/5019* (2013.01); *H04L 41/12* (2013.01); *H04L 41/16* (2013.01); *H04L 41/5006* (2013.01); *H04L 41/5009* (2013.01)

(58) Field of Classification Search
CPC ..... H04L 41/12; H04L 41/16; H04L 41/5006; H04L 41/5009; H04L 41/5019
See application file for complete search history.

(56) References Cited

U.S. PATENT DOCUMENTS

2015/0345622 A1   12/2015   Sujan
2018/0026904 A1*   1/2018   Van De Groenendaal ................. G06F 13/4022 709/226

(Continued)

FOREIGN PATENT DOCUMENTS

WO   2021236529   11/2021

OTHER PUBLICATIONS

"European Application Serial No. 23171088.0, Extended European Search Report dated Nov. 16, 2023", 19 pgs.

(Continued)

*Primary Examiner* — Gil H. Lee
(74) *Attorney, Agent, or Firm* — Schwegman Lundberg & Woessner, P.A.

(57) ABSTRACT

Various systems and methods for providing opportunistic placement of compute in an edge network are described herein. A node in an edge network may be configured to access a service level agreement related to a workload, the workload to be orchestrated for a user equipment by the node; modify a machine learning model based on the service level agreement; implement the machine learning model to identify resource requirements to execute the workload in a manner to satisfy the service level agreement; initiate resource assignments from a resource provider, the resource assignments to satisfy the resource requirements; construct a resource hierarchy from the resource assignments; initiate execution of the workload using resources from the resource hierarchy; and monitor and adapt execution of the workload based on the resource hierarchy in response to the execution of the workload.

25 Claims, 11 Drawing Sheets

(51) Int. Cl.
    *H04L 41/5006*     (2022.01)
    *H04L 41/5009*     (2022.01)
    *H04L 41/5019*     (2022.01)

(56) References Cited

U.S. PATENT DOCUMENTS

| | | | |
|---|---|---|---|
| 2021/0014113 A1 | 1/2021 | Guim Bernat et al. | |
| 2021/0014114 A1 | 1/2021 | Doshi et al. | |
| 2021/0174447 A1* | 6/2021 | Li | G06Q 40/06 |
| 2022/0383324 A1* | 12/2022 | Sheshadri | G06Q 20/4016 |

OTHER PUBLICATIONS

Parsaeefard, Saeedeh, "Artificial Intelligence as a Service (Al-aaS) on Software-Defined Infrastructure", IEEE Conference On Standards For Communications And Networking (CSCN) IEEE, (Oct. 28, 2019), 1-7.

* cited by examiner

US 11,996,992 B2

OPPORTUNISTIC PLACEMENT OF COMPUTE IN AN EDGE NETWORK

TECHNICAL FIELD

Embodiments described herein generally relate to computer network management, and in particular, to a system that provides opportunistic placement of compute in an edge network.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, improve network backhaul traffic, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved.

In a similar manner, Internet of Things (IoT) networks and devices are designed to offer a distributed compute arrangement, from a variety of endpoints. IoT devices are physical or virtualized objects that may communicate on a network, and may include sensors, actuators, and other input/output components, which may be used to collect data or perform actions in a real world environment. For example, IoT devices may include low-powered endpoint devices that are embedded or attached to everyday things, such as buildings, vehicles, packages, etc., to provide an additional level of artificial sensory perception of those things. Recently, IoT devices have become more popular and thus applications using these devices have proliferated.

The deployment of various Edge, Fog, MEC, and IoT networks, devices, and services have introduced a number of advanced use cases and scenarios occurring at and towards the edge of the network. However, these advanced use cases have also introduced a number of corresponding technical challenges relating to security, processing and network resources, service availability and efficiency, among many other issues, especially as more types of computing systems and configurations are deployed. One such challenge is in relation to security and trust, and the operational states of software programs and data, as represented in memory (e.g., DRAM memory), cache memory (e.g., in a cache), or registers (e.g., CPU, GPU, or IPU (Infrastructure Processing Unit)).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
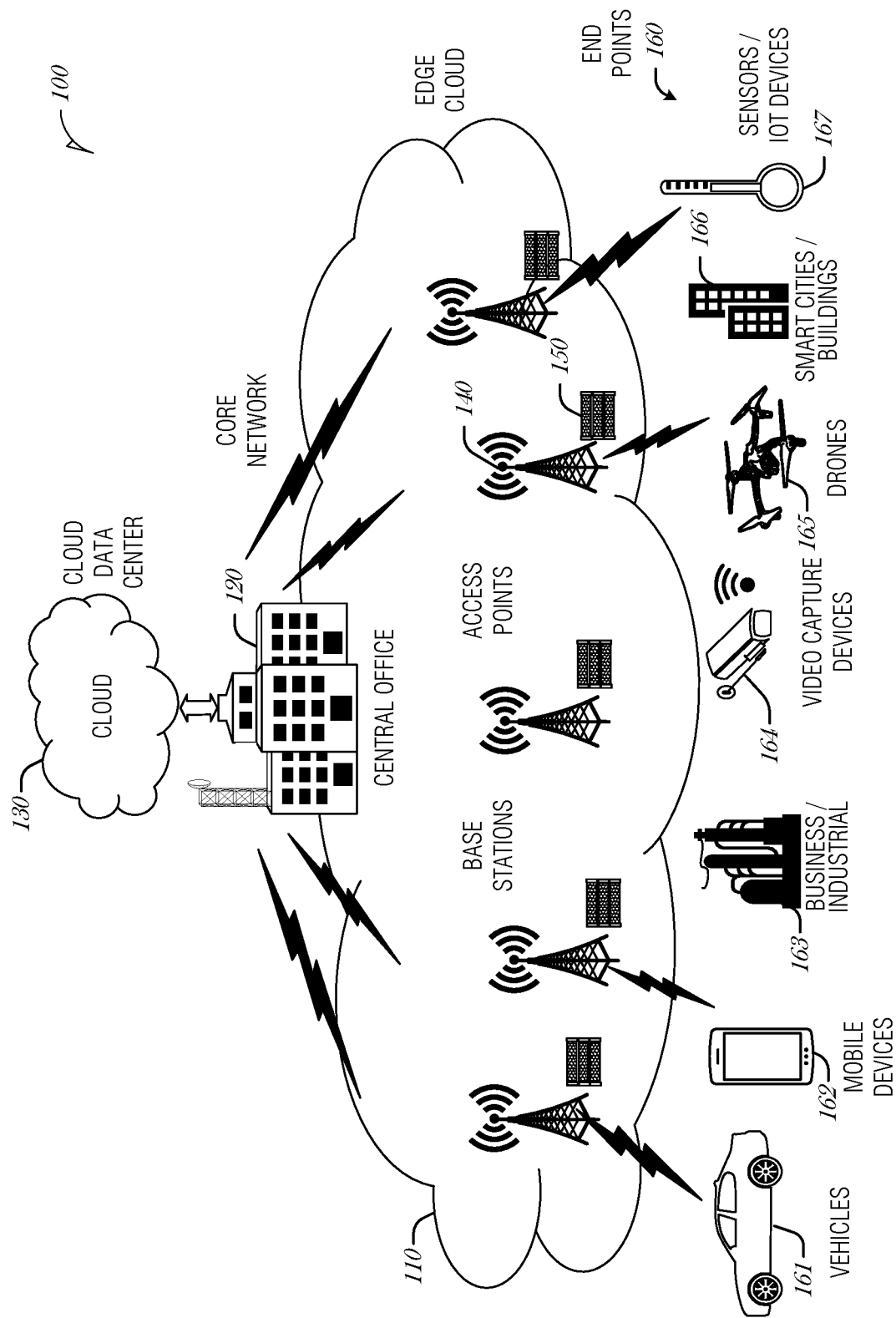
FIG. 1 illustrates an overview of an Edge cloud configuration for Edge computing.

Systems and methods described herein provide for opportunistic placement of compute in a cloud, edge, or local network. In such network topologies, one of the goals is to emulate a system with infinite storage, processing power, bandwidth, and other network facilities for end users and client devices. In edge computing, for instance, engineers and system designers aim to provide this type of system with apparently unbounded resources to international mobile telecom networks. The addition of latency in large scale mobile networks presents several challenges. Among these is the challenge of dynamic resource reassignment in response to resource underflow or resource availability projections.

Cloud-based middleware can build service mesh architectures that provide advanced resiliency features such as fault tolerance, replication, resiliency, load balancing, and the like. However, providing a similar class of resiliency features to edge and mobile networks (e.g., 5G/6G networks) is more difficult due to various reasons. For instance, there is limited horizontal scaling of resources in edge devices as east-west scaling often involves many geographically isolated locations such as base stations or other radio access network (RAN) equipment. Further, heterogenous resources are not easily repurposed and dynamic resources on the edge may appear and disappear without warning. Some resources may not have mobile or roaming capability, and other resources may have performance requirements that do not scale well (e.g., power, battery, connectivity). The issue of security is present when resources may reside in unsecured locations. What is needed is a mechanism to provide better resource resiliency and performance.

Edge computing creates a connectivity network linking user endpoint or user equipment (UE) devices to edge services that are migrated from the cloud closer to the UE through core, regional, and base station (BS) nodes. This migration mechanism is referred to as opportunistic placement of compute (OPC). While present edge computing mechanisms seek to decrease the latency between the UE and the backend services (e.g., processing and storage), the edge infrastructure is not designed for resiliency. In contrast, cloud computing provides for resiliency but at a cost of increased latency. Thus, many implementations for edge computing are optimized for latency but not for resiliency and many implementations of cloud computing are optimized for resiliency but not for latency.

The systems and methods described herein use a resource hierarchy from the RAN to a cloud deployment that can be used for performance optimization, while also creating resource redundancy that can be leveraged to rebuild production networks. Resources may be dynamically discovered and allocated to resiliency pools based on resource availability at a given geographic location. The resiliency pools may change according to the RAN/RAT context, UE roaming context, edge infrastructure build out context, etc. Using these systems and methods, edge networks are improved to discover and use available resources and dynamically pool them to address resiliency requirements.

This document describes enhanced edge networking using resource management controllers to manage resources, resulting in better performance and higher resiliency at the edge. These functions and others are described in more detail below.

FIG. 1 is a block diagram 100 showing an overview of a configuration for Edge computing, which includes a layer of processing referred to in many of the following examples as an "Edge cloud". As shown, the Edge cloud 110 is co-located at an Edge location, such as an access point or base station 140, a local processing hub 150, or a central office 120, and thus may include multiple entities, devices, and equipment instances. The Edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the Edge cloud 110 are critical to providing ultra-low latency response times for services and functions used by the endpoint data sources 160 as well as reduce network backhaul traffic from the Edge cloud 110 toward cloud data center 130 thus improving energy consumption and overall network usages among other benefits.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce the amount of resources needed for network services, through the distribution of more resources which are located closer both geographically and in network access time. In this manner, Edge computing attempts to bring the compute resources to the workload data where appropriate, or, bring the workload data to the compute resources.

The following describes aspects of an Edge cloud architecture that covers multiple potential deployments and addresses restrictions that some network operators or service providers may have in their own infrastructures. These include, variation of configurations based on the Edge location (because edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge", "close Edge", "local Edge", "middle Edge", or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture) implemented at base stations, gateways, network routers, or other devices which are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
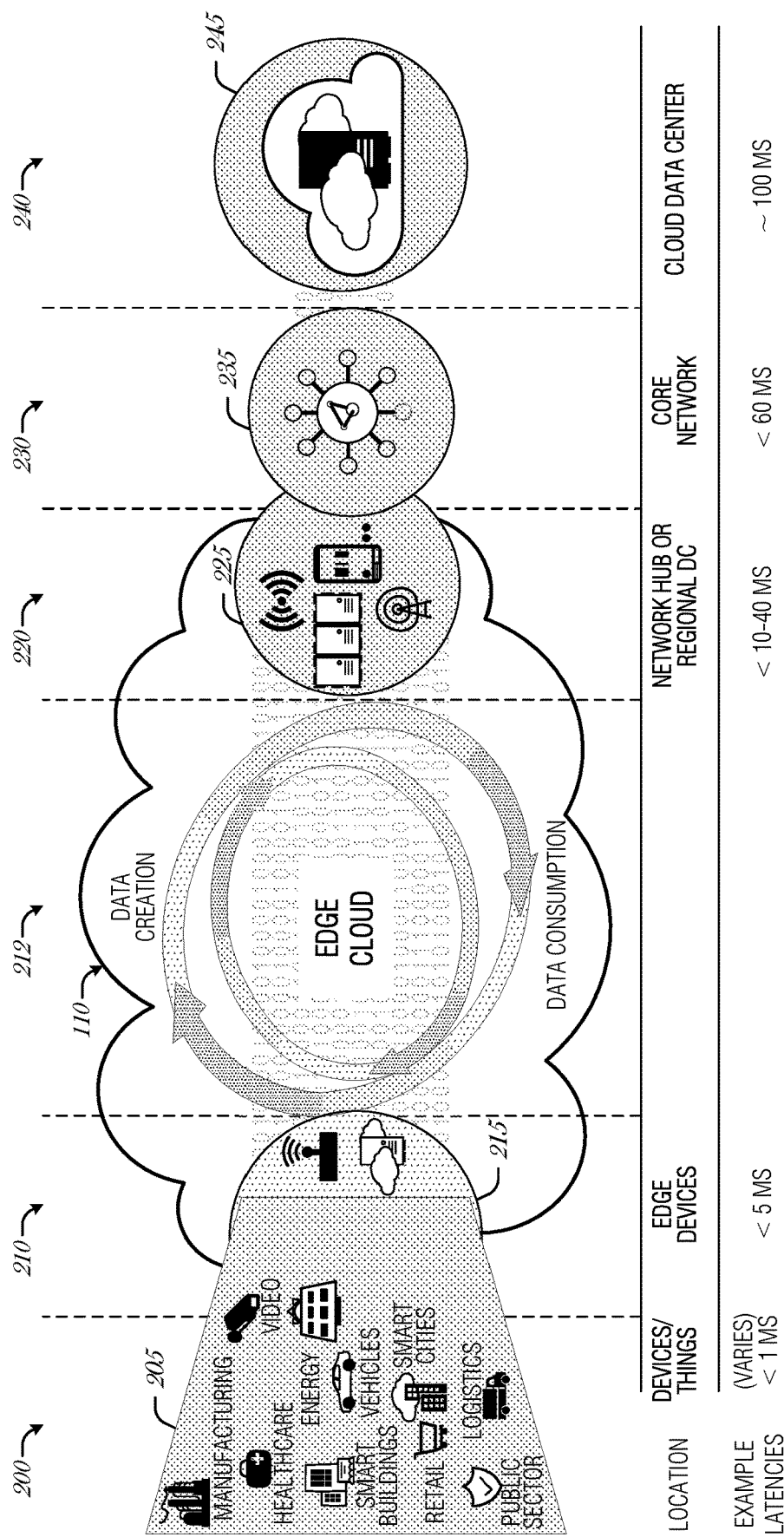
FIG. 2 illustrates operational layers among endpoints, an Edge cloud, and cloud computing environments.

FIG. 2 illustrates operational layers among endpoints, an Edge cloud, and cloud computing environments. Specifically, FIG. 2 depicts examples of computational use cases 205, utilizing the Edge cloud 110 among multiple illustrative layers of network computing. The layers begin at an endpoint (devices and things) layer 200, which accesses the Edge cloud 110 to conduct data creation, analysis, and data consumption activities. The Edge cloud 110 may span multiple network layers, such as an Edge devices layer 210 having gateways, on-premise servers, or network equipment (nodes 215) located in physically proximate Edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the Edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the Edge devices layer 210, to even between 10 to 40 ms when communicating with nodes at the network access layer 220. Beyond the Edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close Edge", "local Edge", "near Edge", "middle Edge", or "far Edge" layers, relative to a network source and destination. For instance, from the perspective of the core network data center 235 or a cloud data center 245, a central office or content data network may be considered as being located within a "near Edge" layer ("near" to the cloud, having high latency values when communicating with the devices and endpoints of the use cases 205), whereas an access point, base station, on-premise server, or network gateway may be considered as located within a "far Edge" layer ("far" from the cloud, having low latency values when communicating with the devices and endpoints of the use cases 205). It will be understood that other categorizations of a particular network layer as constituting a "close", "local", "near", "middle", or "far" Edge may be based on latency, distance, number of network hops, or other measurable characteristics, as measured from a source in any of the network layers 200-240.

The various use cases 205 may access resources under usage pressure from incoming streams, due to multiple services utilizing the Edge cloud. To achieve results with low latency, the services executed within the Edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, Edge computing within the Edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of Edge computing comes the following caveats. The devices located at the Edge are often resource constrained and therefore there is pressure on usage of Edge resources. Typically, this is addressed through the pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because Edge locations may be unmanned and may even need permissioned access (e.g., when housed in a third-party location). Such issues are magnified in the Edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud 110 (network layers 200-240), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco", or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud 110.

As such, the Edge cloud 110 is formed from network components and functional features operated by and within Edge gateway nodes, Edge aggregation nodes, or other Edge compute nodes among network layers 210-230. The Edge cloud 110 thus may be embodied as any type of network that provides Edge computing and/or storage resources which are proximately located to radio access network (RAN) capable endpoint devices (e.g., mobile computing devices, IoT devices, smart devices, etc.), which are discussed herein. In other words, the Edge cloud 110 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the Edge cloud 110 may be servers, multi-tenant servers, appliance computing devices, and/or any other type of computing devices. For example, the Edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, Edge devices are devices presented in the network for a specific purpose (e.g., a traffic light), but may have processing and/or other capacities that may be utilized for other purposes. Such Edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 6B. The Edge cloud 110 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
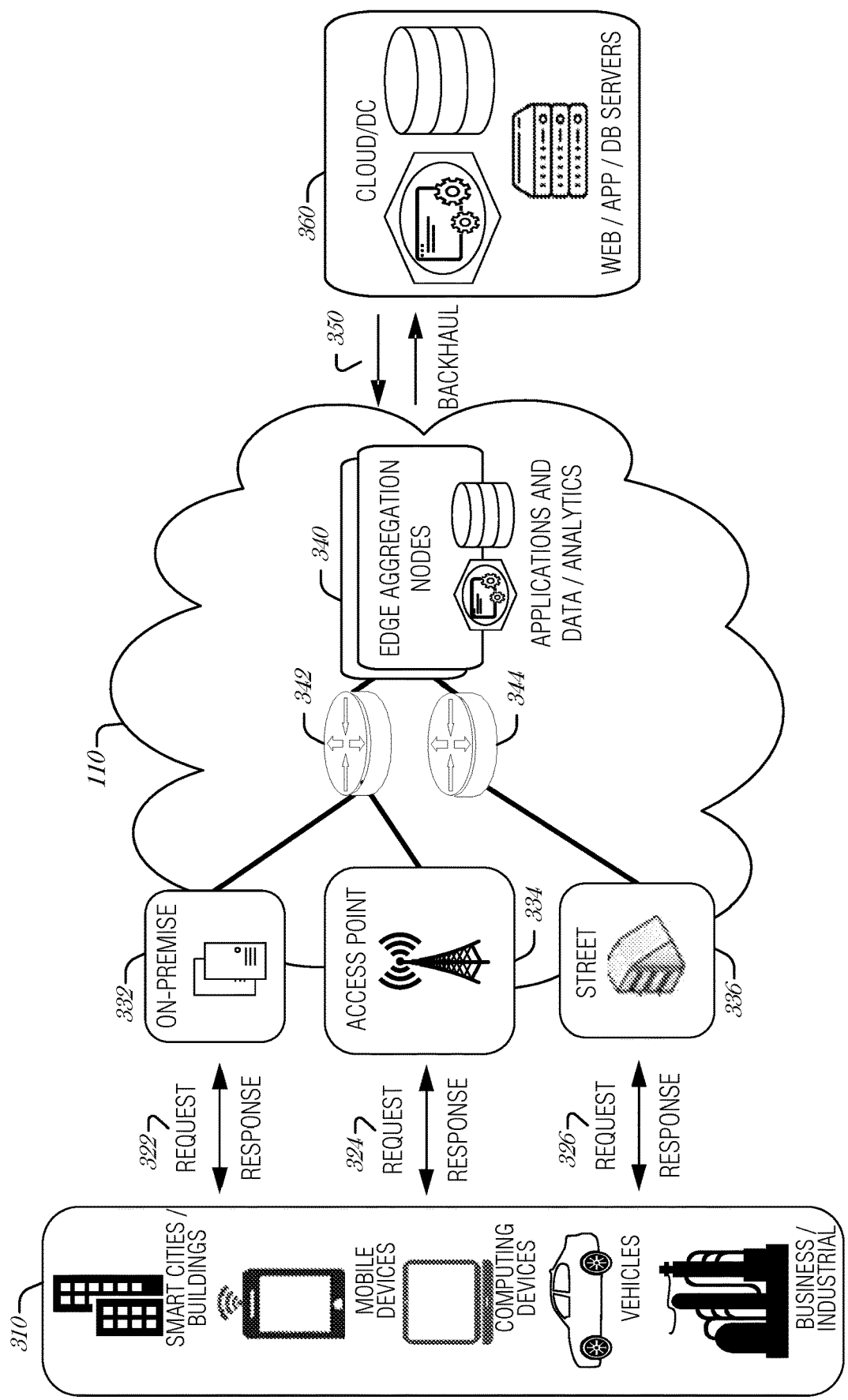
FIG. 3 illustrates an example approach for networking and services in an Edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the Edge cloud 110 to aggregate traffic and requests. Thus, within the Edge cloud 110, the TSP may deploy various compute and storage resources, such as at Edge aggregation nodes 340, to provide requested content. The Edge aggregation nodes 340 and other systems of the Edge cloud 110 are connected to a cloud or data center 360, which uses a backhaul network 350 to fulfill higher-latency requests from a cloud/data center for websites, applications, database servers, etc. Additional or consolidated instances of the Edge aggregation nodes 340 and the aggregation points 342, 344, including those deployed on a single server framework, may also be present within the Edge cloud 110 or other areas of the TSP infrastructure.

Figure 4:
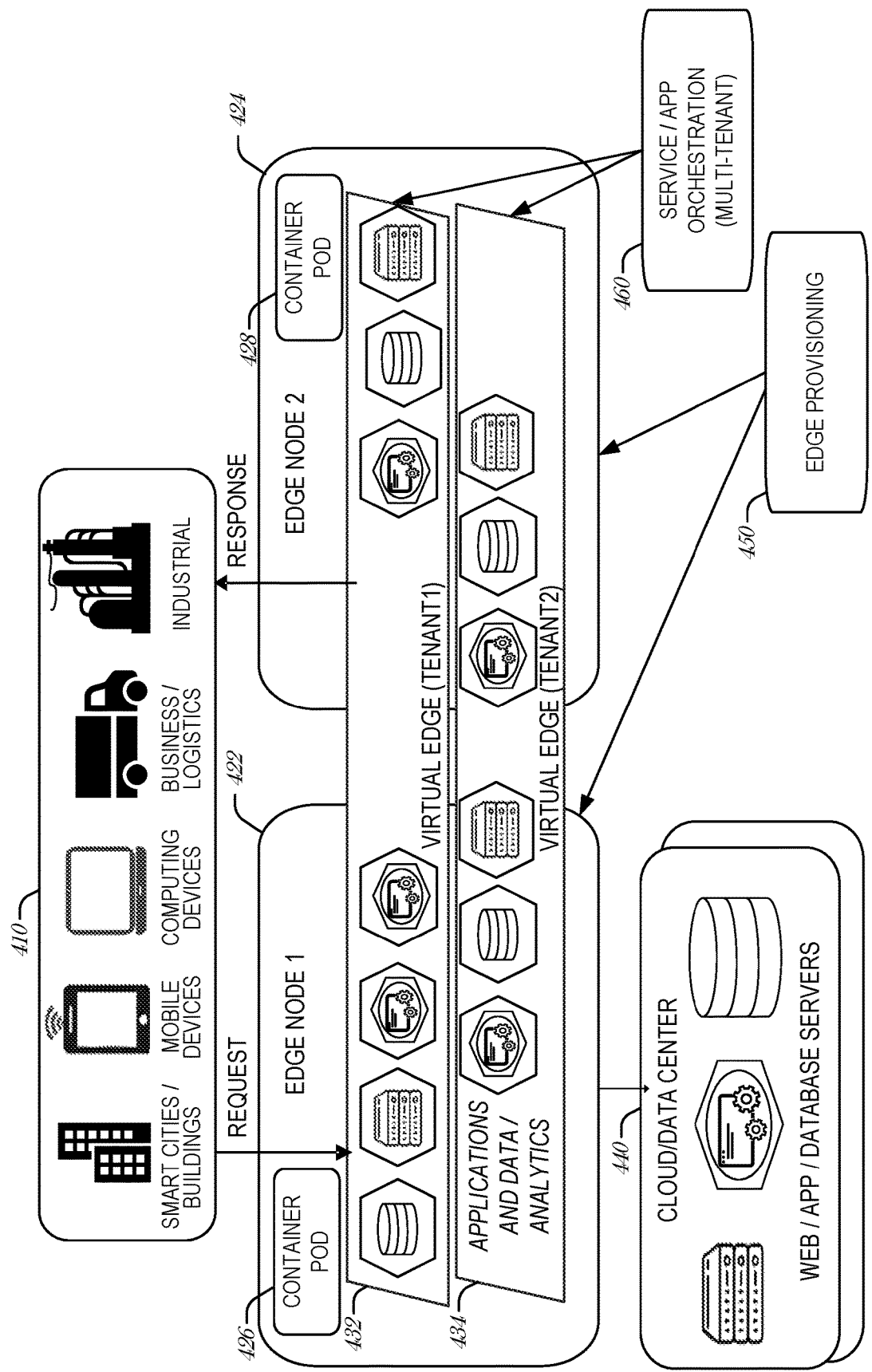
FIG. 4 illustrates deployment of a virtual Edge configuration in an Edge computing system operated among multiple Edge nodes and multiple tenants.

FIG. 4 illustrates deployment and orchestration for virtualized and container-based Edge configurations across an Edge computing system operated among multiple Edge nodes and multiple tenants (e.g., users, providers) which use such Edge nodes. Specifically, FIG. 4 depicts coordination of a first Edge node 422 and a second Edge node 424 in an Edge computing system 400, to fulfill requests and responses for various client endpoints 410 (e.g., smart cities/building systems, mobile devices, computing devices, business/logistics systems, industrial systems, etc.), which access various virtual Edge instances. Here, the virtual Edge instances 432, 434 provide Edge compute capabilities and processing in an Edge cloud, with access to a cloud/data center 440 for higher-latency requests for websites, applications, database servers, etc. However, the Edge cloud enables coordination of processing among multiple Edge nodes for multiple tenants or entities.

In the example of FIG. 4, these virtual Edge instances include: a first virtual Edge 432, offered to a first tenant (Tenant 1), which offers a first combination of Edge storage, computing, and services; and a second virtual Edge 434, offering a second combination of Edge storage, computing, and services. The virtual Edge instances 432, 434 are distributed among the Edge nodes 422, 424, and may include scenarios in which a request and response are fulfilled from the same or different Edge nodes. The configuration of the Edge nodes 422, 424 to operate in a distributed yet coordinated fashion occurs based on Edge provisioning functions 450. The functionality of the Edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective Edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual Edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes often use containers, FaaS engines, Servlets, servers, or other computation abstraction that may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous Edge node. As part of migration of a container, a pod controller at a source Edge node may obtain a migration key from a target Edge node pod controller where the migration key is used to wrap the container-specific keys. When the container/pod is migrated to the target Edge node, the unwrapping key is exposed to the pod controller that then decrypts the wrapped keys. The keys may now be used to perform operations on container specific data. The migration functions may be gated by properly attested Edge nodes and pod managers (as described above).

In further examples, an Edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an Edge computing system may be configured to fulfill requests and responses for various client endpoints from multiple virtual Edge instances (and, from a cloud or remote data center). The use of these virtual Edge instances may support multiple tenants and multiple applications (e.g., augmented reality (AR)/virtual reality (VR), enterprise applications, content delivery, gaming, compute offload) simultaneously. Further, there may be multiple types of applications within the virtual Edge instances (e.g., normal applications; latency sensitive applications; latency-critical applications; user plane applications; networking applications; etc.). The virtual Edge instances may also be spanned across systems of multiple owners at different geographic locations (or, respective computing systems and resources which are co-owned or co-managed by multiple owners).

For instance, each Edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various Edge node resources (e.g., storage, compute, services, depicted with hexagons) provided for the respective Edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different Edge node that does satisfy it. Alternatively, the first pod may be allowed to execute and a different shared pod controller is installed and invoked prior to the second pod executing.

Figure 5:
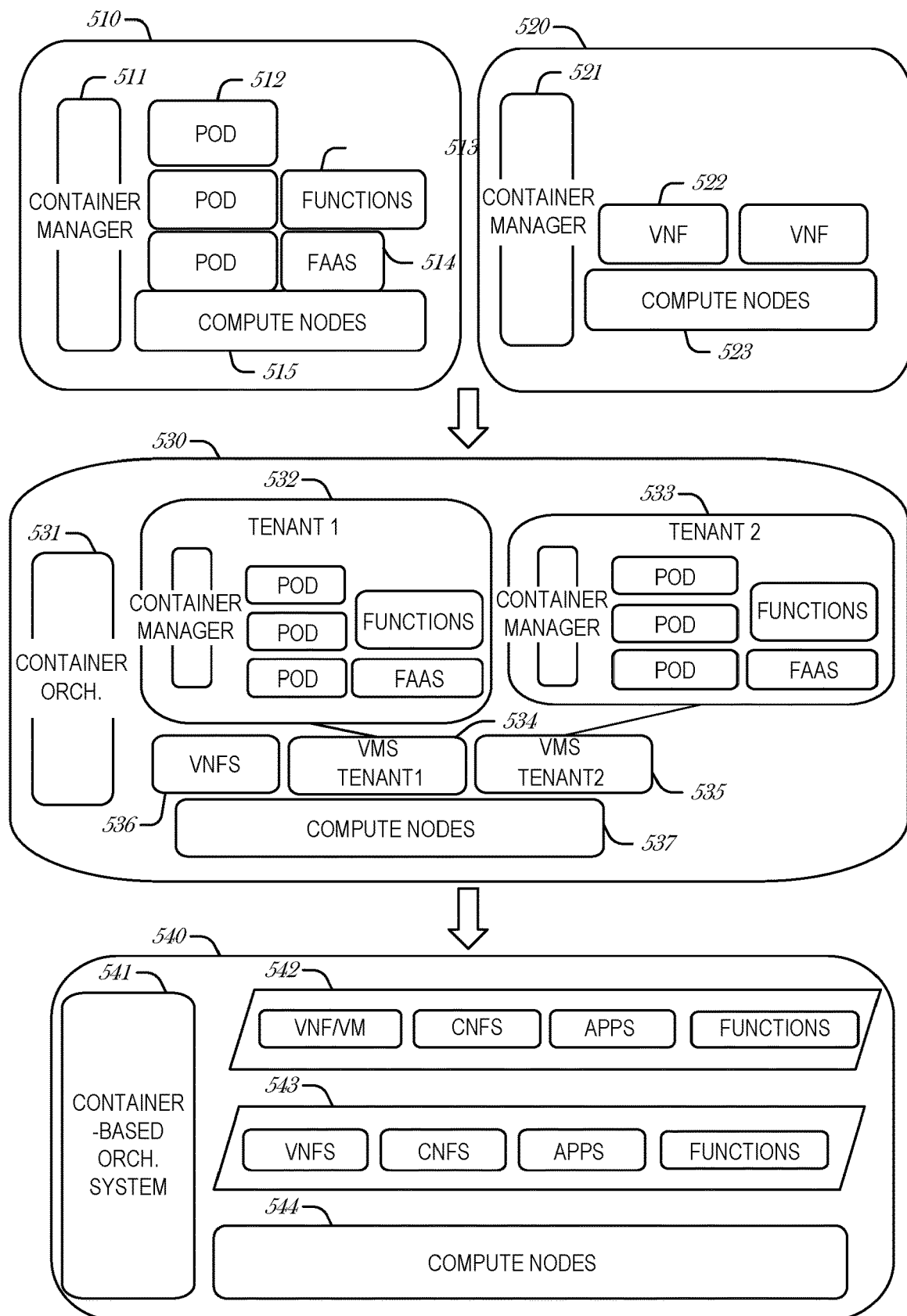
FIG. 5 illustrates various compute arrangements deploying containers in an Edge computing system.

FIG. 5 illustrates additional compute arrangements deploying containers in an Edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple Edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but Edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by Edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an Edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

In further examples, any of the compute nodes or devices discussed with reference to the present Edge computing systems and environment may be fulfilled based on the components depicted in FIGS. 6A and 6B. Respective Edge compute nodes may be embodied as a type of device, appliance, computer, or other "thing" capable of communicating with other Edge, networking, or endpoint components. For example, an Edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 6A:
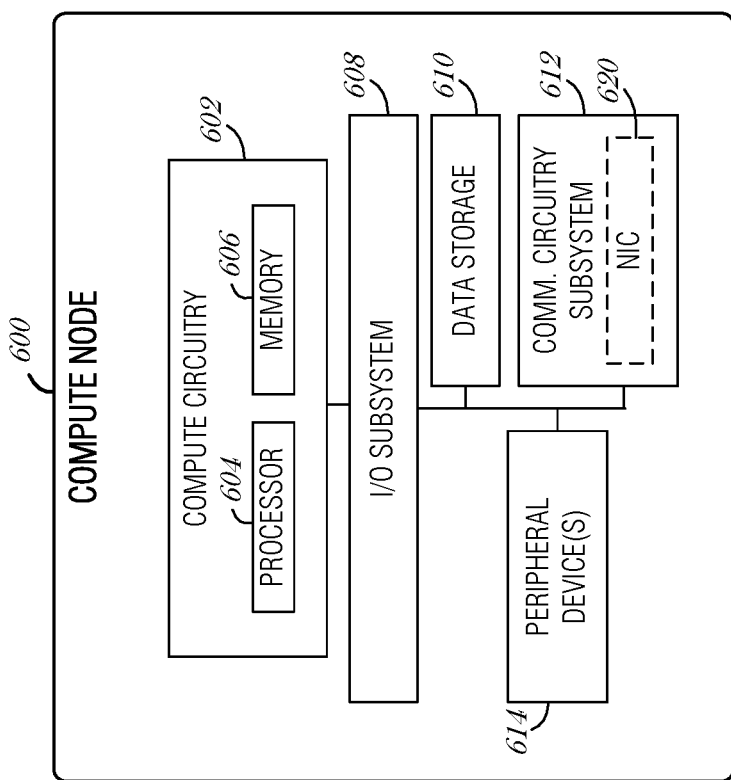
FIG. 6A provides an overview of example components for compute deployed at a compute node in an Edge computing system.

In the simplified example depicted in FIG. 6A, an Edge compute node 600 includes a compute engine (also referred to herein as "compute circuitry") 602, an input/output (I/O) subsystem (also referred to herein as "I/O circuitry") 608, data storage (also referred to herein as "data storage circuitry") 610, a communication circuitry subsystem 612, and, optionally, one or more peripheral devices (also referred to herein as "peripheral device circuitry") 614. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 600 may be embodied as any type of engine, device, or collection of devices capable of performing various compute functions. In some examples, the compute node 600 may be embodied as a single device such as an integrated circuit, an embedded system, a field-programmable gate array (FPGA), a system-on-a-chip (SOC), or other integrated system or device. In the illustrative example, the compute node 600 includes or is embodied as a processor (also referred to herein as "processor circuitry") 604 and a memory (also referred to herein as "memory circuitry") 606. The processor 604 may be embodied as any type of processor(s) capable of performing the functions described herein (e.g., executing an application). For example, the processor 604 may be embodied as a multi-core processor(s), a microcontroller, a processing unit, a specialized or special purpose processing unit, or other processor or processing/controlling circuit.

In some examples, the processor 604 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 604 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs or programmed FPGAs). Such an xPU may be designed to receive, retrieve and/or otherwise obtain programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 604 may work in coordination with each other to execute many types of operations and instructions within and on behalf of the compute node 600.

The memory 606 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device (e.g., memory circuitry) is any number of block addressable memory devices, such as those based on NAND or NOR technologies (for example, Single-Level Cell ("SLC"), Multi-Level Cell ("MLC"), Quad-Level Cell ("QLC"), Tri-Level Cell ("TLC"), or some other NAND). In some examples, the memory device(s) includes a byte-addressable write-in-place three dimensional crosspoint memory device, or other byte addressable write-in-place non-volatile memory (NVM) devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory. A memory device may also include a three-dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may include a transistor-less stackable cross point architecture in which memory cells sit at the intersection of word lines and bit lines and are individually addressable and in which bit storage is based on a change in bulk resistance. In some examples, all or a portion of the memory 606 may be integrated into the processor 604. The memory 606 may store various software and data used during operation such as one or more applications, data operated on by the application(s), libraries, and drivers.

In some examples, resistor-based and/or transistor-less memory architectures include nanometer scale phase-change memory (PCM) devices in which a volume of phase-change material resides between at least two electrodes. Portions of the example phase-change material exhibit varying degrees of crystalline phases and amorphous phases, in which varying degrees of resistance between the at least two electrodes can be measured. In some examples, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods of time (e.g., approximately 10 years at room temperature). Write operations to example PCM devices (e.g., set to logical "0", set to logical "1", set to an intermediary resistance value) are accomplished by applying one or more current pulses to the at least two electrodes, in which the pulses have a particular current magnitude and duration. For instance, a long low current pulse (SET) applied to the at least two electrodes causes the example PCM device to reside in a low-resistance crystalline state, while a comparatively short high current pulse (RESET) applied to the at least two electrodes causes the example PCM device to reside in a high-resistance amorphous state.

In some examples, implementation of PCM devices facilitates non-von Neumann computing architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann computing architectures. However, PCM devices minimize and, in some cases, eliminate data transfers between the CPU and memory by performing some computing operations in-memory. Stated differently, PCM devices both store information and execute computational tasks. Such non-von Neumann computing architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

The compute circuitry 602 is communicatively coupled to other components of the compute node 600 via the I/O subsystem 608, which may be embodied as circuitry and/or components to facilitate input/output operations with the compute circuitry 602 (e.g., with the processor 604 and/or the main memory 606) and other components of the compute circuitry 602. For example, the I/O subsystem 608 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 608 may form a portion of a system-on-a-chip (SoC) and be incorporated, along with one or more of the processor 604, the memory 606, and other components of the compute circuitry 602, into the compute circuitry 602.

The one or more illustrative data storage devices/disks 610 may be embodied as one or more of any type(s) of physical device(s) configured for short-term or long-term storage of data such as, for example, memory devices, memory, circuitry, memory cards, flash memory, hard disk drives, solid-state drives (SSDs), and/or other data storage devices/disks. Individual data storage devices/disks 610 may include a system partition that stores data and firmware code for the data storage device/disk 610. Individual data storage devices/disks 610 may also include one or more operating system partitions that store data files and executables for operating systems depending on, for example, the type of compute node 600.

The communication circuitry 612 may be embodied as any communication circuit, device, or collection thereof, capable of enabling communications over a network between the compute circuitry 602 and another compute device (e.g., an Edge gateway of an implementing Edge computing system). The communication circuitry 612 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 612 includes a network interface controller (NIC) 620, which may also be referred to as a host fabric interface (HFI). The NIC 620 may be embodied as one or more add-in-boards, daughter cards, network interface cards, controller chips, chipsets, or other devices that may be used by the compute node 600 to connect with another compute device (e.g., an Edge gateway node). In some examples, the NIC 620 may be embodied as part of a system-on-a-chip (SoC) that includes one or more processors, or included on a multichip package that also contains one or more processors. In some examples, the NIC 620 may include a local processor (not shown) and/or a local memory (not shown) that are both local to the NIC 620. In such examples, the local processor of the NIC 620 may be capable of performing one or more of the functions of the compute circuitry 602 described herein. Additionally, or alternatively, in such examples, the local memory of the NIC 620 may be integrated into one or more components of the client compute node at the board level, socket level, chip level, and/or other levels.

Additionally, in some examples, a respective compute node 600 may include one or more peripheral devices 614. Such peripheral devices 614 may include any type of peripheral device found in a compute device or server such as audio input devices, a display, other input/output devices, interface devices, and/or other peripheral devices, depending on the particular type of the compute node 600. In further examples, the compute node 600 may be embodied by a respective Edge compute node (whether a client, gateway, or aggregation node) in an Edge computing system or like forms of appliances, computers, subsystems, circuitry, or other components.

Figure 6B:
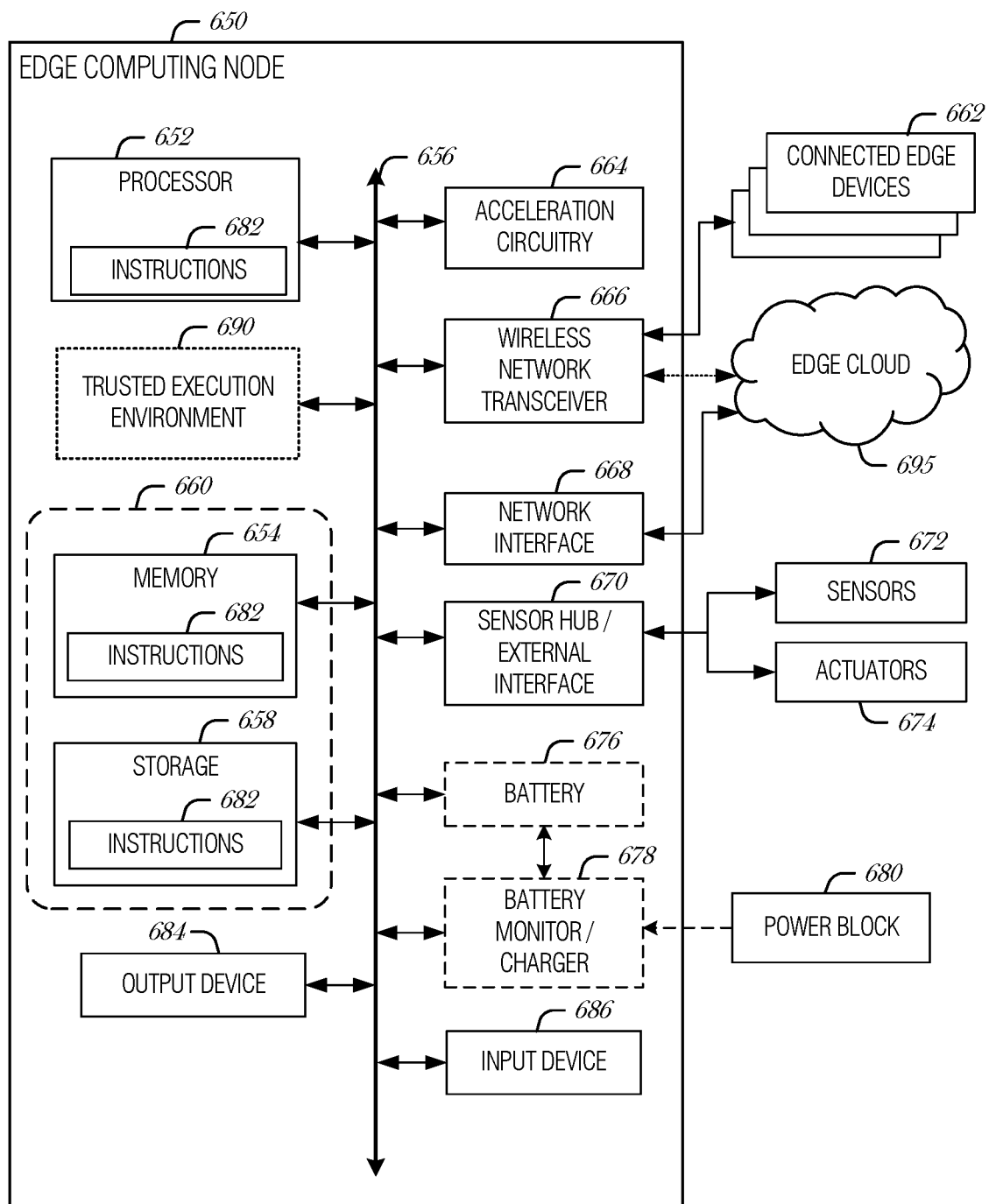
FIG. 6B provides a further overview of example components within a computing device in an Edge computing system.

In a more detailed example, FIG. 6B illustrates a block diagram of an example of components that may be present in an Edge computing node 650 for implementing the techniques (e.g., operations, processes, methods, and methodologies) described herein. This Edge computing node 650 provides a closer view of the respective components of node 600 when implemented as or as part of a computing device (e.g., as a mobile device, a base station, server, gateway, etc.). The Edge computing node 650 may include any combination of the hardware or logical components referenced herein, and it may include or couple with any device usable with an Edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the Edge computing node 650, or as components otherwise incorporated within a chassis of a larger system.

The Edge computing device 650 may include processing circuitry in the form of a processor 652, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 652 may be a part of a system on a chip (SoC) in which the processor 652 and other components are formed into a single integrated circuit, or a single package, such as the Edison™ or Galileo™ SoC boards from Intel Corporation, Santa Clara, California. As an example, the processor 652 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 652 and accompanying circuitry may be provided in a single socket form factor, multiple socket form factor, or a variety of other formats, including in limited hardware configurations or configurations that include fewer than all elements shown in FIG. 6B.

The processor 652 may communicate with a system memory 654 over an interconnect 656 (e.g., a bus). Any number of memory devices may be used to provide for a given amount of system memory. As examples, the memory 654 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 658 may also couple to the processor 652 via the interconnect 656. In an example, the storage 658 may be implemented via a solid-state disk drive (SSDD). Other devices that may be used for the storage 658 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 658 may be on-die memory or registers associated with the processor 652. However, in some examples, the storage 658 may be implemented using a micro hard disk drive (HDD). Further, any number of new technologies may be used for the storage 658 in addition to, or instead of, the technologies described, such resistance change memories, phase change memories, holographic memories, or chemical memories, among others.

The components may communicate over the interconnect 656. The interconnect 656 may include any number of technologies, including industry standard architecture (ISA), extended ISA (EISA), peripheral component interconnect (PCI), peripheral component interconnect extended (PCIx), PCI express (PCIe), or any number of other technologies. The interconnect 656 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 656 may couple the processor 652 to a transceiver 666, for communications with the connected Edge devices 662. The transceiver 666 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected Edge devices 662. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 666 (or multiple transceivers) may communicate using multiple standards or radios for communications at a different range. For example, the Edge computing node 650 may communicate with close devices, e.g., within about 10 meters, using a local transceiver based on Bluetooth Low Energy (BLE), or another low power radio, to save power. More distant connected Edge devices 662, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 666 (e.g., a radio transceiver) may be included to communicate with devices or services in a cloud (e.g., an Edge cloud 695) via local or wide area network protocols. The wireless network transceiver 666 may be a low-power wide-area (LPWA) transceiver that follows the IEEE 802.15.4, or IEEE 802.15.4g standards, among others. The Edge computing node 650 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 666, as described herein. For example, the transceiver 666 may include a cellular transceiver that uses spread spectrum (SPA/SAS) communications for implementing high-speed communications. Further, any number of other protocols may be used, such as Wi-Fi® networks for medium speed communications and provision of network communications. The transceiver 666 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 668 may be included to provide a wired communication to nodes of the Edge cloud 695 or to other devices, such as the connected Edge devices 662 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 668 may be included to enable connecting to a second network, for example, a first NIC 668 providing communications to the cloud over Ethernet, and a second NIC 668 providing communications to other devices over another type of network.

Given the variety of types of applicable communications from the device to another component or network, applicable communications circuitry used by the device may include or be embodied by any one or more of components 664, 666, 668, or 670. Accordingly, in various examples, applicable means for communicating (e.g., receiving, transmitting, etc.) may be embodied by such communications circuitry.

The Edge computing node 650 may include or be coupled to acceleration circuitry 664, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific Edge computing tasks for service management and service operations discussed elsewhere in this document.

The interconnect 656 may couple the processor 652 to a sensor hub or external interface 670 that is used to connect additional devices or subsystems. The devices may include sensors 672, such as accelerometers, level sensors, flow sensors, optical light sensors, camera sensors, temperature sensors, global navigation system (e.g., GPS) sensors, pressure sensors, barometric pressure sensors, and the like. The hub or interface 670 further may be used to connect the Edge computing node 650 to actuators 674, such as power switches, valve actuators, an audible sound generator, a visual warning device, and the like.

In some optional examples, various input/output (I/O) devices may be present within or connected to, the Edge computing node 650. For example, a display or other output device 684 may be included to show information, such as sensor readings or actuator position. An input device 686, such as a touch screen or keypad may be included to accept input. An output device 684 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the Edge computing node 650. A display or console hardware, in the context of the present system, may be used to provide output and receive input of an Edge computing system; to manage components or services of an Edge computing system; identify a state of an Edge computing component or service; or to conduct any other number of management or administration functions or service use cases.

A battery 676 may power the Edge computing node 650, although, in examples in which the Edge computing node 650 is mounted in a fixed location, it may have a power supply coupled to an electrical grid, or the battery may be used as a backup or for temporary capabilities. The battery 676 may be a lithium ion battery, or a metal-air battery, such as a zinc-air battery, an aluminum-air battery, a lithium-air battery, and the like.

A battery monitor/charger 678 may be included in the Edge computing node 650 to track the state of charge (SoCh) of the battery 676, if included. The battery monitor/charger 678 may be used to monitor other parameters of the battery 676 to provide failure predictions, such as the state of health (SoH) and the state of function (SoF) of the battery 676. The battery monitor/charger 678 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 678 may communicate the information on the battery 676 to the processor 652 over the interconnect 656. The battery monitor/charger 678 may also include an analog-to-digital (ADC) converter that enables the processor 652 to directly monitor the voltage of the battery 676 or the current flow from the battery 676. The battery parameters may be used to determine actions that the Edge computing node 650 may perform, such as transmission frequency, mesh network operation, sensing frequency, and the like.

A power block 680, or other power supply coupled to a grid, may be coupled with the battery monitor/charger 678 to charge the battery 676. In some examples, the power block 680 may be replaced with a wireless power receiver to obtain the power wirelessly, for example, through a loop antenna in the Edge computing node 650. A wireless battery charging circuit, such as an LTC4020 chip from Linear Technologies of Milpitas, California, among others, may be included in the battery monitor/charger 678. The specific charging circuits may be selected based on the size of the battery 676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 658 may include instructions 682 in the form of software, firmware, or hardware commands to implement the techniques described herein. Although such instructions 682 are shown as code blocks included in the memory 654 and the storage 658, it may be understood that any of the code blocks may be replaced with hardwired circuits, for example, built into an application specific integrated circuit (ASIC).

In an example, the instructions 682 provided via the memory 654, the storage 658, or the processor 652 may be embodied as a non-transitory, machine-readable medium 660 including code to direct the processor 652 to perform electronic operations in the Edge computing node 650. The processor 652 may access the non-transitory, machine-readable medium 660 over the interconnect 656. For instance, the non-transitory, machine-readable medium 660 may be embodied by devices described for the storage 658 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 660 may include instructions to direct the processor 652 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Also in a specific example, the instructions 682 on the processor 652 (separately, or in combination with the instructions 682 of the machine readable medium 660) may configure execution or operation of a trusted execution environment (TEE) 690. In an example, the TEE 690 operates as a protected area accessible to the processor 652 for secure execution of instructions and secure access to data. Various implementations of the TEE 690, and an accompanying secure area in the processor 652 or the memory 654 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 650 through the TEE 690 and the processor 652.

While the illustrated examples of FIG. 6A and FIG. 6B include example components for a compute node and a computing device, respectively, examples disclosed herein are not limited thereto. As used herein, a "computer" may include some or all of the example components of FIGS. 6A and/or 6B in different types of computing environments. Example computing environments include Edge computing devices (e.g., Edge computers) in a distributed networking arrangement such that particular ones of participating Edge computing devices are heterogenous or homogeneous devices. As used herein, a "computer" may include a personal computer, a server, user equipment, an accelerator, etc., including any combinations thereof. In some examples, distributed networking and/or distributed computing includes any number of such Edge computing devices as illustrated in FIGS. 6A and/or 6B, each of which may include different sub-components, different memory capacities, I/O capabilities, etc. For example, because some implementations of distributed networking and/or distributed computing are associated with particular desired functionality, examples disclosed herein include different combinations of components illustrated in FIGS. 6A and/or 6B to satisfy functional objectives of distributed computing tasks. In some examples, the term "compute node" or "computer" only includes the example processor 604, memory 606 and I/O subsystem 608 of FIG. 6A. In some examples, one or more objective functions of a distributed computing task(s) rely on one or more alternate devices/structure located in different parts of an Edge networking environment, such as devices to accommodate data storage (e.g., the example data storage 610), input/output capabilities (e.g., the example peripheral device(s) 614), and/or network communication capabilities (e.g., the example NIC 620).

In some examples, computers operating in a distributed computing and/or distributed networking environment (e.g., an Edge network) are structured to accommodate particular objective functionality in a manner that reduces computational waste. For instance, because a computer includes a subset of the components disclosed in FIGS. 6A and 6B, such computers satisfy execution of distributed computing objective functions without including computing structure that would otherwise be unused and/or underutilized. As such, the term "computer" as used herein includes any combination of structure of FIGS. 6A and/or 6B that is capable of satisfying and/or otherwise executing objective functions of distributed computing tasks. In some examples, computers are structured in a manner commensurate to corresponding distributed computing objective functions in a manner that downscales or upscales in connection with dynamic demand In some examples, different computers are invoked and/or otherwise instantiated in view of their ability to process one or more tasks of the distributed computing request(s), such that any computer capable of satisfying the tasks proceed with such computing activity.

In the illustrated examples of FIGS. 6A and 6B, computing devices include operating systems. As used herein, an "operating system" is software to control example computing devices, such as the example Edge compute node 600 of FIG. 6A and/or the example Edge compute node 650 of FIG. 6B. Example operating systems include, but are not limited to consumer-based operating systems (e.g., Microsoft® Windows® 10, Google® Android® OS, Apple® Mac® OS, etc.). Example operating systems also include, but are not limited to industry-focused operating systems, such as real-time operating systems, hypervisors, etc. An example operating system on a first Edge compute node may be the same or different than an example operating system on a second Edge compute node. In some examples, the operating system invokes alternate software to facilitate one or more functions and/or operations that are not native to the operating system, such as particular communication protocols and/or interpreters. In some examples, the operating system instantiates various functionalities that are not native to the operating system. In some examples, operating systems include varying degrees of complexity and/or capabilities. For instance, a first operating system corresponding to a first Edge compute node includes a real-time operating system having particular performance expectations of responsivity to dynamic input conditions, and a second operating system corresponding to a second Edge compute node includes graphical user interface capabilities to facilitate end-user I/O.

The instructions 682 may further be transmitted or received over a communications network using a transmission medium via the wireless network transceiver 466 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards, IEEE 802.15.4 family of standards, a Long Term Evolution (LTE) family of standards, a Universal Mobile Telecommunications System (UMTS) family of standards, peer-to-peer (P2P) networks, a next generation (NG)/5th generation (5G) standards among others.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in the US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7085 MHz and 5925-6425 MHz band (note: under consideration in US and EU, respectively. Next generation Wi-Fi system is expected to include the 6 GHz spectrum as operating band, but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Figure 7:
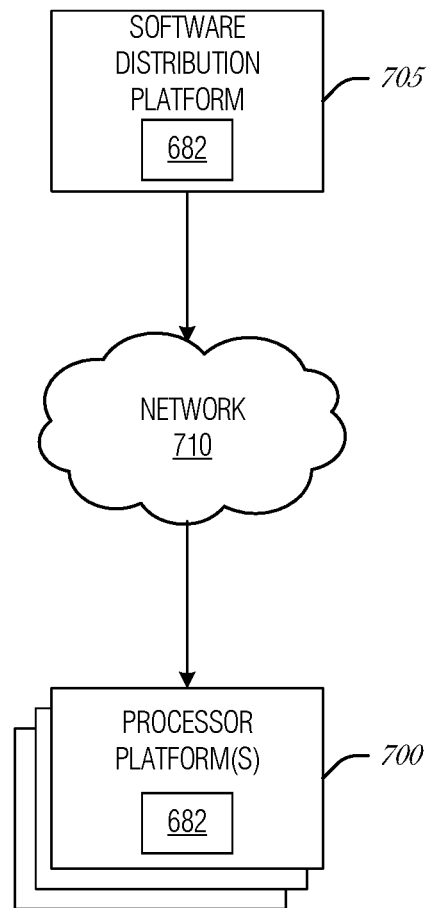
FIG. 7 illustrates an example software distribution platform to distribute software, such as the example computer readable instructions of FIG. 6B, to one or more devices, according to an embodiment.

FIG. 7 illustrates an example software distribution platform 705 to distribute software, such as the example computer readable instructions 682 of FIG. 6B, to one or more devices, such as example processor platform(s) 710 and/or example connected Edge devices. The example software distribution platform 705 may be implemented by any computer server, data facility, cloud service, etc., capable of storing and transmitting software to other computing devices (e.g., third parties, the example connected Edge devices). Example connected Edge devices may be customers, clients, managing devices (e.g., servers), third parties (e.g., customers of an entity owning and/or operating the software distribution platform 705). Example connected Edge devices may operate in commercial and/or home automation environments. In some examples, a third party is a developer, a seller, and/or a licensor of software such as the example computer readable instructions 682 of FIG. 6B. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected Edge devices) geographically and/or logically separated from each other (e.g., physically separated IoT devices chartered with the responsibility of water distribution control (e.g., pumps), electricity distribution control (e.g., relays), etc.).

In the illustrated example of FIG. 7, the software distribution platform 705 includes one or more servers and one or more storage devices. The storage devices store the computer readable instructions 682. The one or more servers of the example software distribution platform 705 are in communication with a network 715, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 682 from the software distribution platform 605. For example, the software, which may correspond to the example computer readable instructions, may be downloaded to the example processor platform(s) 700 (e.g., example connected Edge devices), which is/are to execute the computer readable instructions 682 to implement the content insertion at a switch. In some examples, one or more servers of the software distribution platform 705 are communicatively connected to one or more security domains and/or security devices through which requests and transmissions of the example computer readable instructions 682 must pass. In some examples, one or more servers of the software distribution platform 705 periodically offer, transmit, and/or force updates to the software (e.g., the example computer readable instructions 682 of FIG. 6B) to ensure improvements, patches, updates, etc. are distributed and applied to the software at the end user devices.

In the illustrated example of FIG. 7, the computer readable instructions 682 are stored on storage devices of the software distribution platform 705 in a particular format. A format of computer readable instructions includes, but is not limited to a particular code language (e.g., Java, JavaScript, Python, C, C #, SQL, HTML, etc.), and/or a particular code state (e.g., uncompiled code (e.g., ASCII), interpreted code, linked code, executable code (e.g., a binary), etc.). In some examples, the computer readable instructions 682 stored in the software distribution platform 705 are in a first format when transmitted to the example processor platform(s) 710. In some examples, the first format is an executable binary in which particular types of the processor platform(s) 710 can execute. However, in some examples, the first format is uncompiled code that requires one or more preparation tasks to transform the first format to a second format to enable execution on the example processor platform(s) 710. For instance, the receiving processor platform(s) 710 may need to compile the computer readable instructions 682 in the first format to generate executable code in a second format that is capable of being executed on the processor platform(s) 710. In still other examples, the first format is interpreted code that, upon reaching the processor platform(s) 710, is interpreted by an interpreter to facilitate execution of instructions.

Using opportunistic placement of compute (OPC), a system provider is able to provide seemingly unbounded network resources to network clients and services. As demand for network resources increase in a particular area of the network or in a particular slice of the network, resource management controllers can dynamically reassign nascent resource pools to the hot spot workloads (workloads that require a relatively high amount of resources) that may span device, edge, and cloud networks.

Figure 8:
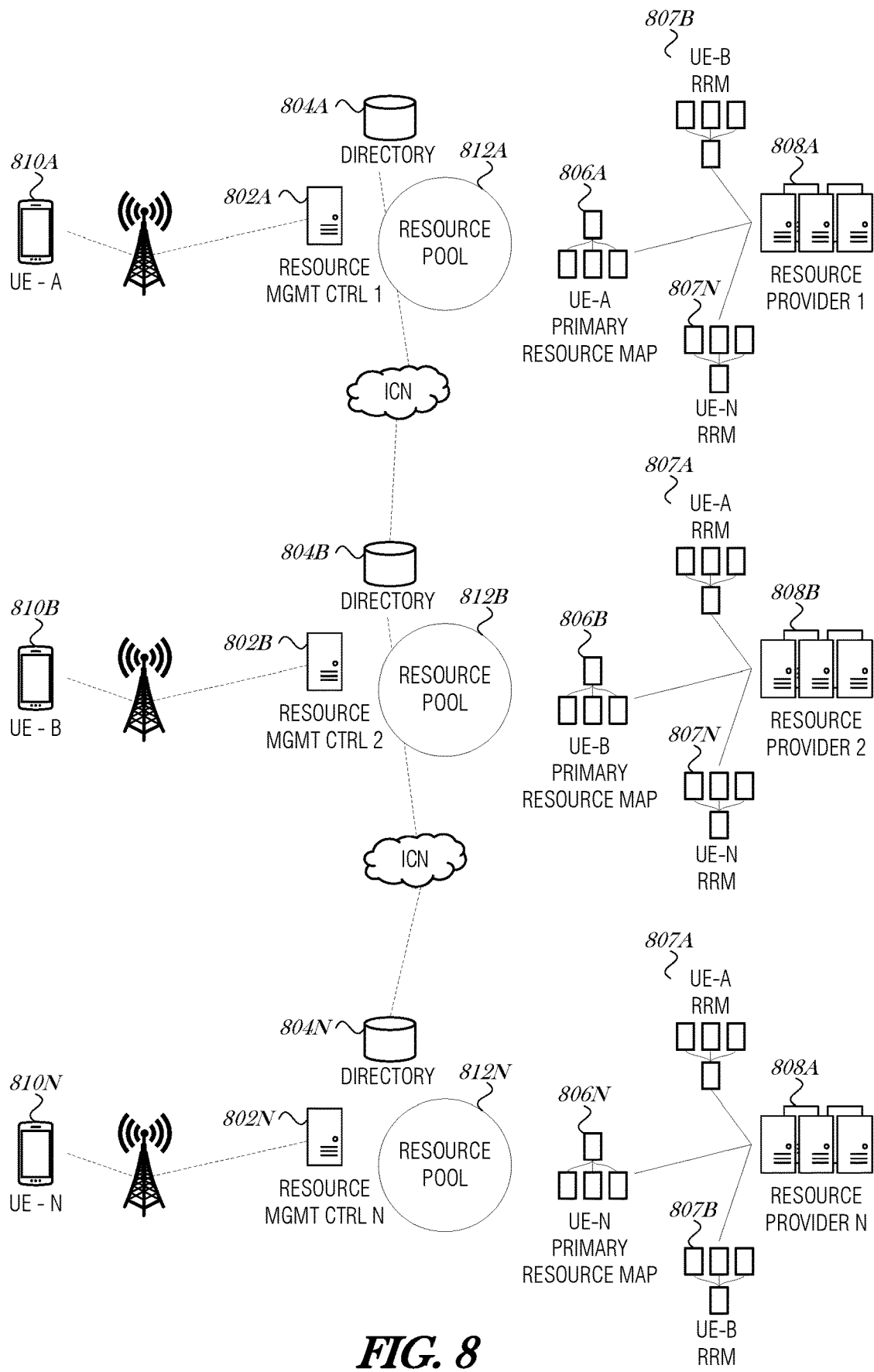
FIG. 8 is a block diagram illustrating a system for opportunistic placement of compute, according to an embodiment.

FIG. 8 is a block diagram illustrating a system 800 for opportunistic placement of compute, according to an embodiment. The system 800 includes resource management controllers (RMC) 802A, 802B, . . . , 802N that are used to maintain directories 804A, 804B, . . . , 804N of resource maps. The resource maps include details of primary and resiliency (e.g., failover, backup, secondary, or redundant) resources. Primary resource maps (PRM) 806A, 806B, . . . , 806N are used to allocate resources necessary for computation is that is close to the UE. Resiliency resource maps (RRM) 807A, 807B, . . . , 807N are used to allocate, predict, or pre-allocate (e.g., reserve) resources that are useful for resiliency (e.g., backup, failover, hot plug, etc.). Resources associated with RRMs may be distributed across multiple resource providers (RP) to better protect or recover from Fault-Attack-Failure-Outage (FAFO) events. In FIG. 8, there are three resource providers, RP1 808A, RP2, 808B, and RPN 808N. It is understood that multiple resource providers may be used for a particular resource map or that multiple resource maps may rely on a single resource provider.

A resource map is a pointer to a resource. Resource maps 806, 807 can have additional information about the resource such as cost, latency, size, capacity, available-unavailable status, etc. A resource map 806, 807 stores the location of the actual resource and maintains a record of resource ear marks and allocations.

Resource maps are maps of available resources. These resources may be available in a hierarchical manner or not, e.g., CPU resource map may be sorted from a low-end, energy efficient CPU, to high-end CPU for heavy workloads.

Similarly, for storage the resource maps may show system memory storage available, persistent memory available, etc. These resources may be arranged following various hierarchy, e.g., for storage arranged by memory size available, or read/write latency available. Similar resources may be arranged in different resource maps ranked differently based on various properties.

A directory 804 includes a list of physical resources and may have additional information. In some ways, the contents of a directory 804 may be quite similar to what is in the resource maps 806, 807, but a directory 804 primarily shows resources that are available for assignment. Resources that go offline/online will be reflected in a directory 804.

An RMC 802 may use a directory 804 to find new resources to allocate. An RMC 802 may create a resource map 806, 807 to reflect the allocated resource. An RMC 802 may move an allocated resource from one resource map 806, 807 to another without changing the resource's allocation status. Alternatively, an RMC 802 may free the resource from the resource map 806, 807, place the resource back into the free pool, update the directory 804, then re-allocate it to a second resource map 806, 807.

Referring to FIG. 8, a UE, "UE-B" 810B has an established resource pool (R2) 812B that defines a primary resource map, "Map-B" 806B, allocating resources from a resource provider RP2 808B. Resource pools 812 can be organized into hierarchies. The resources in R2 812B may be cached copies of resources in RP2 808B or those that are primarily in resource pool R2 812B with a resilience backup in RP2 808B. In either case, if a FAFO causes R2 812B to be out of sync with respect to RP2 808B, then the primary resource is used to reconstruct or resynchronize the out of sync resource.

For instance, UE-B 810B may be roaming such that the local resources in R2 812B may become farther away in terms of latency overhead as UE-B 810B roams to the next BS or RAT endpoint. The resource management controller RMC-2 802B coordinates with RMC-1 802A to pre-allocate, reserve, or pre-assign resources out of the R1 812A resource pool, which may include resources from resource provider RP1 808A. This may be based on an assessed roaming trajectory of the UE-B 810B.

The resource management controller RMC-2 802B identifies resource requirements (e.g., storage, compute, etc.) in resource pool R2 812B and tags the resources for replication or migration to resource pool R1 812A. When R1 812A receives the replication or migration request from R2 812B, the resource management controllers RMC-1 802A and RMC-2 802B authorize the replication or migration and then proceed to replicate or migrate the resources. The aim is to complete the migration or replication in advance of the arrival of UE-B 810B into RMC-1's control domain.

Resource management controllers are able to dynamically adjust allocation of resources based on workload requirements. Workloads may be performed across several nodes in a network such that resources at the nodes are allocated in a manner that move with a mobile UE. As another example, a UE may perform a workload that allocates storage resources incrementally. Over time, more of a resource pool is allocated for use by UE. Eventually, the resources in the resource pool may be exhausted. The RMC observes trends in resource utilization. If the availability of a resource becomes critically low, then the RMC may attempt to obtain resources from another resource provider (RP). A RMC may access other RPs in a prioritized order, such as by ordering the RPs based on relative latency-based proximity between the UE and available resources managed by the other RPs.

In an embodiment, an RMC may use machine learning or artificial intelligence (AI) to determine which resources and which RP to request resources from. The RMC may construct a hierarchy of available resources based on latency properties where lower latency resources are considered 'closer' to the UE and longer latency resources are considered 'farther' from the UE. The resource hierarchy may be used to cache or manage replication or migration as a way to create resource resiliency in the network.

Alternatively, an RMC may construct a resource hierarchy based on a combination of properties—not just latency—such that the optimal overall cost of the resources are considered to determine those 'closest' to the UE. A cost function may be used to weight the combination of properties, and may use various factors such as metrics related to response time, availability, durability, resiliency, consistency, integrity, etc. The properties may be weighted based on user preferences, administrator policies, client policies, or the like. For instance, a service level agreement (SLA) may contain user optimization preferences expressed in terms of trade-offs.

For example, given availability, durability, consistency, and integrity cannot be achieved at the highest level all the time, a spider diagram may represent the user's preferences. The spider diagram can be used to weight the AI training model to emphasize or de-emphasize resource costs. A spider diagram is a hub-and-spoke graph that includes a central node, which in this case may indicate an identifier of the UE or an identifier of a workload of a UE, and then secondary nodes that are connected to the central node with edges. Each of the secondary nodes may be used to indicate a configuration parameter (e.g., response time, availability, durability, latency, bandwidth, storage, memory, computation, etc.). The secondary nodes may have tertiary or other nodes that are attached with related configuration parameters. The size of a node is indicative of the weighted preference of a configuration parameter. While a spider diagram is discussed here, it is understood that other mechanisms may be used to represent and store user preferences, such as a table, name-value pairs in a database, a vector of values, and the like.

To manage security and trust in an OPC system, the RMCs can define and manage trust profiles based on a spectrum of trusted computing capabilities in the underlying fabric. For example, nodes that are manufactured with Resiliency Root of Trust (RRoT) capabilities have secure storage for reliability checkpoint logging (RCL) and have trusted capabilities. Such nodes may have a trust profile with a higher rating, score, or some other indicator of higher trustworthiness. Nodes that are not manufactured with RRoT capabilities (e.g., legacy or low-cost equipment) may not have RCL, and as such, may have a lower trust profile indicator. Resource management controllers may interrogate nodes to perform attestation and determine that the node has RRoT capabilities. Nodes with higher trust ratings may have a corresponding higher resource cost.

Resource management controllers may consider a number of factors when identifying and allocating resources for a UE or a workload. An RMC may consider cost functions used to evaluate an overall cost of using resources, a cost of a particular resource, customer SLAs, customer preferences related to using a UE as a resource, subscriptions or other reservations for resources, or the like.

Cost functions may be associated with resources. A cost function may be based on a latency map, a storage hierarchy, a computation map, or a resource redundancy depth. A latency map includes resources and a corresponding latency estimate for each resource relative to a current network position of the UE. A storage hierarchy includes storage resources organized by features. A cost of storage may be determined given a particular location in a storage hierarchy. Storage features may include the volatility, security, durability, availability, consistency, integrity, or the like, of the storage resource. Computation maps include compute resource and a corresponding compute cost in terms of power per unit of work. A resource redundancy depth is an indicator of the number of redundant resources available for conscription and the overhead required to allocate or deallocate such resources.

The cost of a resource may change over time depending on the usage or demand for the resource. An RMC may observe the usage or demand. This maintains the resource usage or demand at the infrastructure level as the customer does not need to be aware of these details. The RMC may use functions that factor in the workload requirements, cost of the resources that are needed to satisfy the requirements, and the demand or usage of the resources, to calculate a cost over time. This cost over time can be provided to the customer, who may then adjust an SLA for an acceptable cost for a specific workload placement.

Based on cost functions and tracking resource costs over time, an RMC may provide feedback to a customer about which resource requirements are more or less expensive relative to the value provided. For instance, a customer may ask for a specific function (e.g., image analysis) and an RMC may provide an estimated cost based on alternative options. Options may include tradeoffs such as less overall cost with less consistency, less redundancy, greater latency, etc. From network perspective, a UE may be willing to sacrifice some amount of latency (e.g., 1 ms latency) to obtain a reduced cost (e.g., 30% lower subscription fees). This can provide a way to orchestrate resources that are available as hot plug versus those that are always-on. The level of projection per cost can be estimated so the customer or service can decide on a best available resiliency strategy for a given network location. Further, an RMC may adjust the best available resiliency strategy dynamically as alternatives become available due to changing conditions.

Resiliency resource requests may contain a BYOR (bring your own resource) capability. For example, a network subscriber, provider, or other entity in the edge ecosystem may make underutilized resource available for subscription as OPC resources. A token may be issued that encodes various available on-premise and other private-provider resources, or flexible entitlements to such resources. Consequently, the token informs an edge control plane to integrate and draw upon additional available capacity, which extends availability of already provisioned edge resources.

In another aspect, a UE may be used as a resource when considering a resiliency strategy. The customer may supply their own UE or preferred resources to be used for resiliency or redundancy. Resources may be available on a "spot market" or may become available as other workloads complete and before new workloads are scheduled. The UE resource may be considered "surge capacity" that is prearranged so that resiliency SLOs can be satisfied superficially while underneath, there may be many updates to surge capacity ear marks. Surge capacity may involve collaborating with edge service providers in a seamless fashion.

The customer may indicate whether the UE can be used as a resource with preferences or policies that are communicated to the RMC or other components of a OPC system. The UE may be used conditionally, such as only when it is needed to satisfy an SLA or when other resources become unavailable, as a resilient resource.

In another aspect, the RMC may discover OPC resources. In an embodiment, the RMC may use Information-Centric Network (ICN) or Named Data Network (NDN) technologies as an overlay to the OPC resource pools. When a resource becomes available, the OPC discovery ICN is used to show interest in a pre-allocation or allocation, which may include a resource cost profile. Similarly, when the resource is pre-allocated or allocated, the interest packet is consumed removing it from visibility in the discovery ICN.

Resiliency resourcing requests may be submitted by the UE directly to an OPC node (e.g., the RMC). This allows the UE to poll resources and determine changing resource availability, allowing the UE to take advantage of alternative resourcing strategies as they become available.

Using the discovery network and UE requests, the RMC may perform automatic resource placement. This automatic placement may complement discovery by comparing the resource cost map with the UE, workload, SLA, or desired cost map, obtained from the customer. The resources that fall into the optimal network location may be computed based on a cost intersection algorithm.

Figure 9:
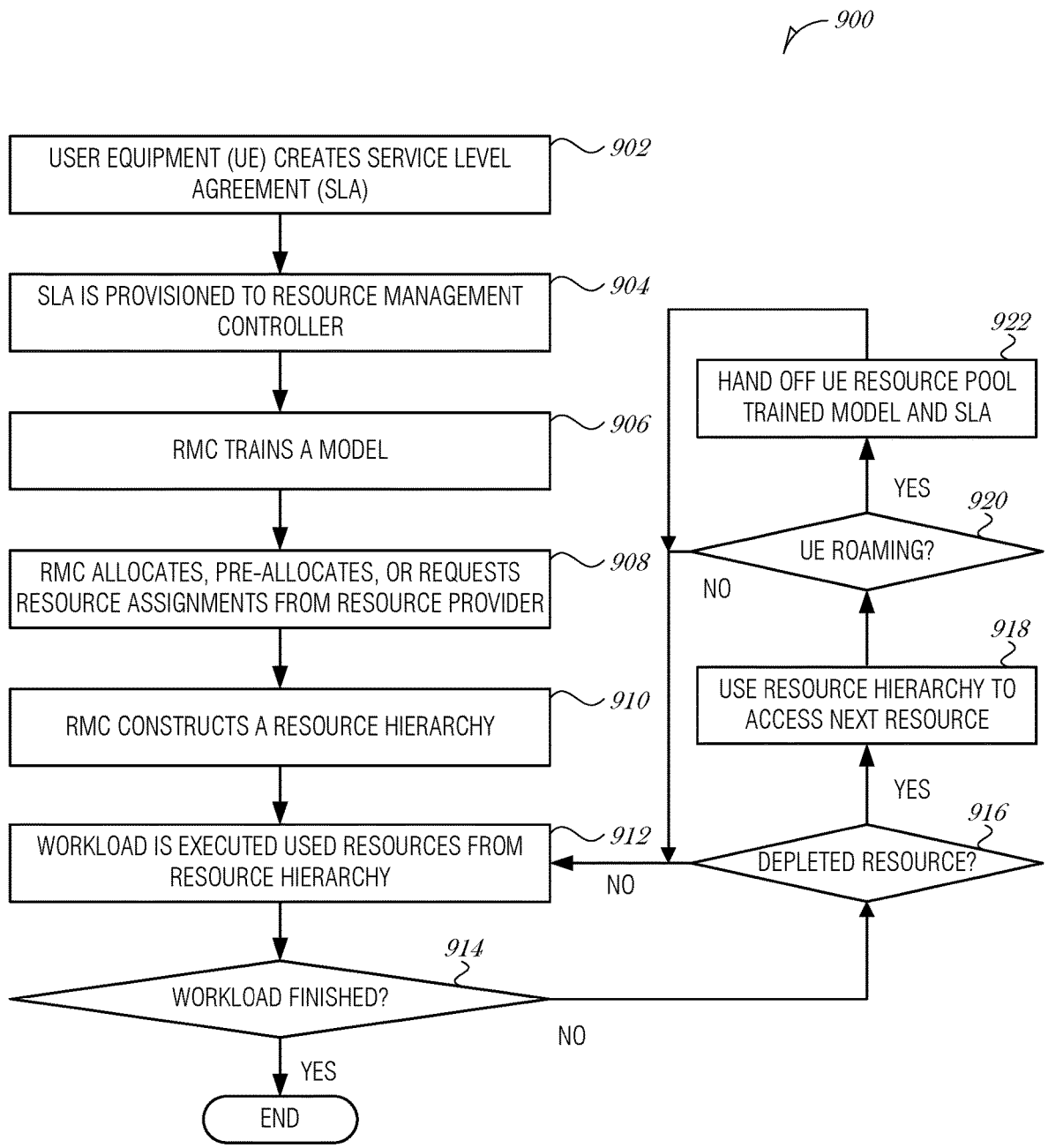
FIG. 9 is a flowchart illustrating a method for managing network resources, according to an embodiment.

FIG. 9 is a flowchart illustrating a method 900 for managing network resources, according to an embodiment.

At 902, a user equipment (UE) creates a service level agreement (SLA). This may be based on input, preferences, or policies that are provided by a user of the UE. The SLA includes acceptable or desired tradeoff properties of resources in a resource hierarchy of resources that are available to the UE. The tradeoff properties may be expressed with a spider diagram.

At 904, the SLA is provisioned to one or more resource management controllers (RMC) servicing the UE.

Typically, there is a user agent (UA) that exists or is instantiated in the network that works on behalf of the UE. The UA takes into consideration any SLA that is defined for the UE and then interacts with the service provider to manage service requests made by the UE.

At 906, the RMC trains an artificial intelligence (AI), machine learning (ML), neural network (NN), or other type of model that is weighted according to tradeoffs expressed in the SLA.

At 908, the RMC allocates, pre-allocates, or requests resource assignments from available resource providers (RP). The RMC may implement an ICN-based discovery process to discover resources and their properties.

In an embodiment, a user may configure the UE to act as a BYOE (bring your own equipment) such that when the service request is made to the UA by the UE, the UE does not power down and instead remains available as a resource for the service request. The UA may determine that the UE should handle the request, thereby granting reduced latency to the service request by fulfilling the request locally at the UE. The setting may be made by a device-to-device policy, by the user through a user interface control, or by other mechanisms. As such, at 908, the RMC may allocate, pre-allocate, or request resource assignments from the UE in addition to RPs.

At 910, the RMC constructs a resource hierarchy optimized for the UE according to the SLA or user preferences. The resource hierarchy populates the UE's resource pool.

At 912, a UE workload executes using resources according to the resource hierarchy.

If the workload is finished (decision block 914), then the method 900 ends. Otherwise, it is determined whether execution of the workload reached a threshold of depleted pool resources (decision block 916). This check may be made periodically during workload execution. If so, then the RMC uses the resource hierarchy to access the next 'closest' resource (operation 918). Then, it is determined whether the UE is roaming such that a next RMC is 'closer' then the current RMC (decision 920). Here, "closeness" is based on latency between the resource and the UE workload. Closeness may also be referred to as latency-based proximity. While geographic proximity or physical proximity may generally align with latency-based proximity, this may not always be the case. For instance, two computers that are distant from each other may have a high-speed network link and be "closer" in terms of latency than two computers that are physically closer, but connected with a slower network link.

If the UE is roaming, then at 922, the UE resource pool trained model and SLA are handed off to the next RMC. If the UE is not roaming, then the method 900 returns to the workload execution operation (block 912).

Figure 10:
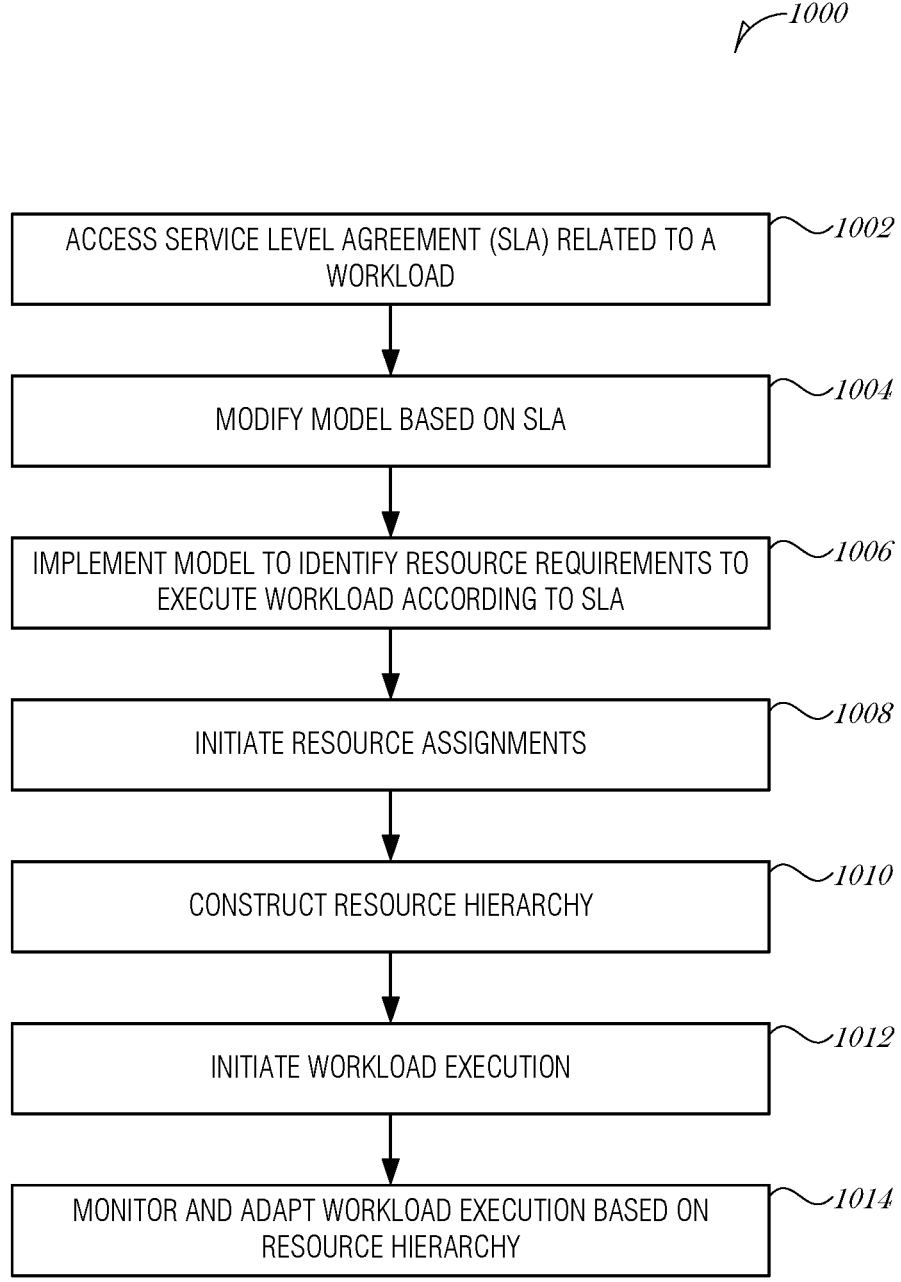
FIG. 10 is a flowchart illustrating a method for implementing opportunistic placement of compute in an edge network, according to an embodiment.

FIG. 10 is a flowchart illustrating a method 1000 for implementing opportunistic placement of compute in an edge network, according to an embodiment. The method 1000 may be performed by a device, compute node, or node, such as an Edge computing node 650.

At 1002, a service level agreement related to a workload is accessed. The workload is to be orchestrated for a user equipment by a node in an edge network.

At 1004, a machine learning model is modified based on the service level agreement. In an embodiment, modifying the machine learning model includes accessing user preferences and weighing the machine learning model to fit (e.g., emphasize or de-emphasize) resource costs to the user preferences. In a further embodiment, the user preferences are stored in a spider diagram.

In an embodiment, modifying the machine learning model includes evaluating trusted computing capabilities of nodes that host resources and using the evaluated trusted computing capabilities of nodes in a cost function to identify resource requirements to execute the workload in a manner to satisfy the service level agreement.

In an embodiment, evaluating trusted computing capabilities includes receiving attestation from a node, the attestation indicating that the node is capable of trusted computing operations.

At 1006, the machine learning model is implemented to identify resource requirements to execute the workload in a manner to satisfy the service level agreement.

At 1008, resource assignments from a resource provider are initiated, where the resource assignments are made to satisfy the resource requirements. In an embodiment, initiating resource assignments from the resource provider includes implementing a cost function to identify resources for the resource assignments, the cost function based on a latency map, a storage hierarchy, a computation map, or a resource redundancy depth.

At 1010, a resource hierarchy is constructed from the resource assignments. In an embodiment, constructing the resource hierarchy includes constructing a primary resource map including resources to be used initially to begin execution the workload and constructing a resiliency resource map including resources that can be used when a resource from the primary resource map becomes unavailable, unresponsive, or fails. In such an embodiment, the primary resource map and the resiliency resource map are integrated into the resource hierarchy.

In an embodiment, constructing the resource hierarchy includes constructing the resource hierarchy using a latency-based metric of each of the resources from the resource assignments.

In an embodiment, constructing the resource hierarchy includes implementing a cost function to construct the resource hierarchy, the cost function used to weigh a plurality of properties including: resource response time, resource availability, resource durability, resource resiliency, resource consistency, or resource integrity. In a further embodiment, the cost function is weighted based on user preferences, administrator policies, client policies, or the service level agreement. In a further embodiment, the user preferences are represented in a spider diagram.

At 1012, execution of the workload is initiated using resources from the resource hierarchy. In an embodiment, initiating execution of the workload includes initiating a portion of workload execution at the user equipment. In a further embodiment, the service level agreement includes an indication that the user equipment is available for use as a resource to execute the workload.

At 1014, execution of the workload is monitored and adapted based on the resource hierarchy in response to execution of the workload. In an embodiment, monitoring and adapting execution of the workload includes migrating the execution of the workload from resources provided by a first resource provider to resources provided by a second resource provider.

In an embodiment, monitoring and adapting execution of the workload includes migrating orchestration of the workload from a first resource management controller to a second resource management controller, where the second resource management controller has a closer latency-based measurement to the user equipment than the first resource management controller.

In an embodiment, monitoring and adapting execution of the workload includes measuring resource usage of the execution of the workload and adapting execution of the workload when the resource usage exceeds a threshold resource usage.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, such as modules, intellectual property (IP) blocks or cores, or mechanisms. Such logic or components may be hardware, software, or firmware communicatively coupled to one or more processors in order to carry out the operations described herein. Logic or components may be hardware modules (e.g., IP block), and as such may be considered tangible entities capable of performing specified operations and may be configured or arranged in a certain manner In an example, circuits may be arranged (e.g., internally or with respect to external entities such as other circuits) in a specified manner as an IP block, IP core, system-on-chip (SoC), or the like.

In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

An IP block (also referred to as an IP core) is a reusable unit of logic, cell, or integrated circuit. An IP block may be used as a part of a field programmable gate array (FPGA), application-specific integrated circuit (ASIC), programmable logic device (PLD), system on a chip (SoC), or the like. It may be configured for a particular purpose, such as digital signal processing or image processing. Example IP cores include central processing unit (CPU) cores, integrated graphics, security, input/output (I/O) control, system agent, graphics processing unit (GPU), artificial intelligence, neural processors, image processing unit, communication interfaces, memory controller, peripheral device control, platform controller hub, or the like.

Additional Notes & Examples

Example 1 is a node in an edge network, comprising: a processor; and memory to store instructions, which when executed by the processor, cause the node to: access a service level agreement related to a workload, the workload to be orchestrated for a user equipment by the node; modify a machine learning model based on the service level agreement; implement the machine learning model to identify resource requirements to execute the workload in a manner to satisfy the service level agreement; initiate resource assignments from a resource provider, the resource assignments to satisfy the resource requirements; construct a resource hierarchy from the resource assignments; initiate execution of the workload using resources from the resource hierarchy; and monitor and adapt execution of the workload based on the resource hierarchy in response to the execution of the workload.

In Example 2, the subject matter of Example 1 includes, wherein the instructions to modify the machine learning model cause the node to: access user preferences; and apply weights to inputs for the machine learning model to fit resource costs to the user preferences.

In Example 3, the subject matter of Example 2 includes, wherein the user preferences are stored in a spider diagram.

In Example 4, the subject matter of Examples 1-3 includes, wherein the instructions to modify the machine learning model cause the node to: evaluate trusted computing capabilities of nodes that host resources; and use the evaluated trusted computing capabilities of nodes in a cost function to identify resource requirements to execute the workload in a manner to satisfy the service level agreement.

In Example 5, the subject matter of Examples 1-4 includes, wherein to evaluate trusted computing capabilities, the node is to: receive attestation from a node, the attestation indicating that the node is capable of trusted computing operations.

In Example 6, the subject matter of Examples 1-5 includes, wherein the instructions to initiate resource assignments from the resource provider cause the node to: implement a cost function to identify resources for the resource assignments, the cost function based on a latency map, a storage hierarchy, a computation map, or a resource redundancy depth.

In Example 7, the subject matter of Examples 1-6 includes, wherein the instructions to construct the resource hierarchy cause the node to: construct a primary resource map including resources to be used initially to begin execution the workload; and construct a resiliency resource map including resources that can be used when a resource from the primary resource map becomes unavailable, unresponsive, or fails; wherein the primary resource map and the resiliency resource map are integrated into the resource hierarchy.

In Example 8, the subject matter of Examples 1-7 includes, wherein the instructions to construct the resource hierarchy cause the node to: construct the resource hierarchy using a latency-based metric of each of the resources from the resource assignments.

In Example 9, the subject matter of Examples 1-8 includes, wherein the instructions to construct the resource hierarchy cause the node to: implement a cost function to construct the resource hierarchy, the cost function used to weigh a plurality of properties including: resource response time, resource availability, resource durability, resource resiliency, resource consistency, or resource integrity.

In Example 10, the subject matter of Example 9 includes, wherein the cost function is weighted based on user preferences, administrator policies, client policies, or the service level agreement.

In Example 11, the subject matter of Example 10 includes, wherein the user preferences are represented in a spider diagram.

In Example 12, the subject matter of Examples 1-11 includes, wherein the instructions to initiate execution of the workload cause the node to: initiate a portion of workload execution at the user equipment.

In Example 13, the subject matter of Example 12 includes, wherein the service level agreement includes an indication that the user equipment is available for use as a resource to execute the workload.

In Example 14, the subject matter of Examples 1-13 includes, wherein the instructions to monitor and adapt execution of the workload cause the node to: migrate the execution of the workload from resources provided by a first resource provider to resources provided by a second resource provider.

In Example 15, the subject matter of Examples 1-14 includes, wherein the instructions to monitor and adapt execution of the workload cause the node to: migrate orchestration of the workload from a first resource management controller to a second resource management controller, where the second resource management controller has a closer latency-based measurement to the user equipment than the first resource management controller.

In Example 16, the subject matter of Examples 1-15 includes, wherein the instructions to monitor and adapt execution of the workload cause the node to: measure resource usage of the execution of the workload; and adapt execution of the workload when the resource usage exceeds a threshold resource usage.

Example 17 is a method, comprising: accessing a service level agreement related to a workload, the workload to be orchestrated for a user equipment by a node in an edge network; modifying a machine learning model based on the service level agreement; implementing the machine learning model to identify resource requirements to execute the workload in a manner to satisfy the service level agreement; initiating resource assignments from a resource provider, the resource assignments to satisfy the resource requirements; constructing a resource hierarchy from the resource assignments; initiating execution of the workload using resources from the resource hierarchy; and monitoring and adapt execution of the workload based on the resource hierarchy in response to the execution of the workload.

In Example 18, the subject matter of Example 17 includes, wherein modifying the machine learning model comprises: accessing user preferences; and applying weights to inputs for the machine learning model to fit resource costs to the user preferences.

In Example 19, the subject matter of Example 18 includes, wherein the user preferences are stored in a spider diagram.

In Example 20, the subject matter of Examples 17-19 includes, wherein modifying the machine learning model comprises: evaluating trusted computing capabilities of nodes that host resources; and using the evaluated trusted computing capabilities of nodes in a cost function to identify resource requirements to execute the workload in a manner to satisfy the service level agreement.

In Example 21, the subject matter of Examples 17-20 includes, wherein evaluating trusted computing capabilities comprises: receiving attestation from a node, the attestation indicating that the node is capable of trusted computing operations.

In Example 22, the subject matter of Examples 17-21 includes, wherein initiating resource assignments from the resource provider comprises: implementing a cost function to identify resources for the resource assignments, the cost function based on a latency map, a storage hierarchy, a computation map, or a resource redundancy depth.

In Example 23, the subject matter of Examples 17-22 includes, wherein constructing the resource hierarchy comprises: constructing a primary resource map including resources to be used initially to begin execution the workload; and constructing a resiliency resource map including resources that can be used when a resource from the primary resource map becomes unavailable, unresponsive, or fails; wherein the primary resource map and the resiliency resource map are integrated into the resource hierarchy.

In Example 24, the subject matter of Examples 17-23 includes, wherein constructing the resource hierarchy comprises: constructing the resource hierarchy using a latency-based metric of each of the resources from the resource assignments.

In Example 25, the subject matter of Examples 17-24 includes, wherein constructing the resource hierarchy comprises: implementing a cost function to construct the resource hierarchy, the cost function used to weigh a plurality of properties including: resource response time, resource availability, resource durability, resource resiliency, resource consistency, or resource integrity.

In Example 26, the subject matter of Example 25 includes, wherein the cost function is weighted based on user preferences, administrator policies, client policies, or the service level agreement.

In Example 27, the subject matter of Example 26 includes, wherein the user preferences are represented in a spider diagram.

In Example 28, the subject matter of Examples 17-27 includes, wherein initiating execution of the workload comprises: initiating a portion of workload execution at the user equipment.

In Example 29, the subject matter of Example 28 includes, wherein the service level agreement includes an indication that the user equipment is available for use as a resource to execute the workload.

In Example 30, the subject matter of Examples 17-29 includes, wherein monitoring and adapting execution of the workload comprises: migrating the execution of the workload from resources provided by a first resource provider to resources provided by a second resource provider.

In Example 31, the subject matter of Examples 17-30 includes, wherein monitoring and adapting execution of the workload comprises: migrating orchestration of the workload from a first resource management controller to a second resource management controller, where the second resource management controller has a closer latency-based measurement to the user equipment than the first resource management controller.

In Example 32, the subject matter of Examples 17-31 includes, wherein monitoring and adapting execution of the workload comprises: measuring resource usage of the execution of the workload; and adapting execution of the workload when the resource usage exceeds a threshold resource usage.

Example 33 is at least one machine-readable medium including instructions, which when executed by a machine, cause the machine to perform operations of any of the methods of Examples 17-32.

Example 34 is an apparatus comprising means for performing any of the methods of Examples 17-32.

Example 35 is at least one machine-readable medium including instructions, which when executed by a node, cause the node to: access a service level agreement related to a workload, the workload to be orchestrated for a user equipment by the node; modify a machine learning model based on the service level agreement; implement the machine learning model to identify resource requirements to execute the workload in a manner to satisfy the service level agreement; initiate resource assignments from a resource provider, the resource assignments to satisfy the resource requirements; construct a resource hierarchy from the resource assignments; orchestrate execution of the workload using resources from the resource hierarchy; and monitor and adapt execution of the workload based on the resource hierarchy in response to the execution of the workload.

In Example 36, the subject matter of Example 35 includes, wherein the instructions to modify the machine learning model cause the node to: access user preferences; and apply weights to inputs for the machine learning model to fit resource costs to the user preferences.

In Example 37, the subject matter of Example 36 includes, wherein the user preferences are stored in a spider diagram.

In Example 38, the subject matter of Examples 35-37 includes, wherein the instructions to modify the machine learning model cause the node to: evaluate trusted computing capabilities of nodes that host resources; and use the evaluated trusted computing capabilities of nodes in a cost function to identify resource requirements to execute the workload in a manner to satisfy the service level agreement.

In Example 39, the subject matter of Examples 35-38 includes, wherein to evaluate trusted computing capabilities, the node is to: receive attestation from a node, the attestation indicating that the node is capable of trusted computing operations.

In Example 40, the subject matter of Examples 35-39 includes, wherein the instructions to initiate resource assignments from the resource provider cause the node to: implement a cost function to identify resources for the resource assignments, the cost function based on a latency map, a storage hierarchy, a computation map, or a resource redundancy depth.

In Example 41, the subject matter of Examples 35-40 includes, wherein the instructions to construct the resource hierarchy cause the node to: construct a primary resource map including resources to be used initially to begin execution the workload; and construct a resiliency resource map including resources that can be used when a resource from the primary resource map becomes unavailable, unresponsive, or fails; wherein the primary resource map and the resiliency resource map are integrated into the resource hierarchy.

In Example 42, the subject matter of Examples 35-41 includes, wherein the instructions to construct the resource hierarchy cause the node to: construct the resource hierarchy using a latency-based metric of each of the resources from the resource assignments.

In Example 43, the subject matter of Examples 35-42 includes, wherein the instructions to construct the resource hierarchy cause the node to: implement a cost function to construct the resource hierarchy, the cost function used to weigh a plurality of properties including: resource response time, resource availability, resource durability, resource resiliency, resource consistency, or resource integrity.

In Example 44, the subject matter of Example 43 includes, wherein the cost function is weighted based on user preferences, administrator policies, client policies, or the service level agreement.

In Example 45, the subject matter of Example 44 includes, wherein the user preferences are represented in a spider diagram.

In Example 46, the subject matter of Examples 35-45 includes, wherein the instructions to orchestrate execution of the workload cause the node to: initiate a portion of workload execution at the user equipment.

In Example 47, the subject matter of Example 46 includes, wherein the service level agreement includes an indication that the user equipment is available for use as a resource to execute the workload.

In Example 48, the subject matter of Examples 35-47 includes, wherein the instructions to monitor and adapt execution of the workload cause the node to: migrate the execution of the workload from resources provided by a first resource provider to resources provided by a second resource provider.

In Example 49, the subject matter of Examples 35-48 includes, wherein the instructions to monitor and adapt execution of the workload cause the node to: migrate orchestration of the workload from a first resource management controller to a second resource management controller, where the second resource management controller has a closer latency-based measurement to the user equipment than the first resource management controller.

In Example 50, the subject matter of Examples 35-49 includes, wherein the instructions to monitor and adapt execution of the workload cause the node to: measure resource usage of the execution of the workload; and adapt execution of the workload when the resource usage exceeds a threshold resource usage.

Example 51 is an edge computing node, operable in an edge computing system, comprising processing circuitry configured to implement any of the examples of 1-50.

Example 52 is an edge computing node, operable as a server in an edge computing system, configured to perform any of the examples of 1-50.

Example 53 is an edge computing node, operable as a client in an edge computing system, configured to perform any of the examples of 1-50.

Example 54 is an edge computing node, operable in a layer of an edge computing network as an aggregation node, network hub node, gateway node, or core data processing node, configured to perform any of the examples of 1-50.

Example 55 is an edge computing network, comprising networking and processing components configured to provide or operate a communications network, to enable an edge computing system to implement any of the examples of 1-50.

Example 56 is an access point, comprising networking and processing components configured to provide or operate a communications network, to enable an edge computing system to implement any of the examples of 1-50.

Example 57 is a base station, comprising networking and processing components configured to provide or operate a communications network, to enable an edge computing system to implement any of the examples of 1-50.

Example 58 is a road-side unit, comprising networking components configured to provide or operate a communications network, to enable an edge computing system to implement any of the examples of 1-50.

Example 59 is an on-premise server, operable in a private communications network distinct from a public edge computing network, the server configured to enable an edge computing system to implement any of the examples of 1-50.

Example 60 is a 3GPP 4G/LTE mobile wireless communications system, comprising networking and processing components configured with the biometric security methods of any of the examples of 1-50.

Example 61 is a 5G network mobile wireless communications system, comprising networking and processing components configured with the biometric security methods of any of the examples of 1-50.

Example 62 is a user equipment device, comprising networking and processing circuitry, configured to connect with an edge computing system configured to implement any of the examples of 1-50.

Example 63 is a client computing device, comprising processing circuitry, configured to coordinate compute operations with an edge computing system, the edge computing system configured to implement any of the examples of 1-50.

Example 64 is an edge provisioning node, operable in an edge computing system, configured to implement any of the examples of 1-50.

Example 65 is a service orchestration node, operable in an edge computing system, configured to implement any of the examples of 1-50.

Example 66 is an application orchestration node, operable in an edge computing system, configured to implement any of the examples of 1-50.

Example 67 is a multi-tenant management node, operable in an edge computing system, configured to implement any of the examples of 1-50.

Example 68 is an edge computing system comprising processing circuitry, the edge computing system configured to operate one or more functions and services to implement any of the examples of 1-50.

Example 69 is networking hardware with network functions implemented thereupon, operable within an edge computing system configured with the biometric security methods of any of examples of 1-50.

Example 70 is acceleration hardware with acceleration functions implemented thereupon, operable in an edge computing system, the acceleration functions configured to implement any of the examples of 1-50.

Example 71 is storage hardware with storage capabilities implemented thereupon, operable in an edge computing system, the storage hardware configured to implement any of the examples of 1-50.

Example 72 is computation hardware with compute capabilities implemented thereupon, operable in an edge computing system, the computation hardware configured to implement any of the examples of 1-50.

Example 73 is an edge computing system adapted for supporting vehicle-to-vehicle (V2V), vehicle-to-everything (V2X), or vehicle-to-infrastructure (V2I) scenarios, configured to implement any of the examples of 1-50.

Example 74 is an edge computing system adapted for operating according to one or more European Telecommunications Standards Institute (ETSI) Multi-Access Edge Computing (MEC) specifications, the edge computing system configured to implement any of the examples of 1-50.

Example 75 is an edge computing system adapted for operating one or more multi-access edge computing (MEC) components, the MEC components provided from one or more of: a MEC proxy, a MEC application orchestrator, a MEC application, a MEC platform, or a MEC service, according to an European Telecommunications Standards Institute (ETSI) Multi-Access Edge Computing (MEC) configuration, the MEC components configured to implement any of the examples of 1-50.

Example 76 is an edge computing system configured as an edge mesh, provided with a microservice cluster, a microservice cluster with sidecars, or linked microservice clusters with sidecars, configured to implement any of the examples of 1-50.

Example 77 is an edge computing system, comprising circuitry configured to implement one or more isolation environments provided among dedicated hardware, virtual machines, containers, virtual machines on containers, configured to implement any of the examples of 1-50.

Example 78 is an edge computing server, configured for operation as an enterprise server, roadside server, street cabinet server, or telecommunications server, configured to implement any of the examples of 1-50.

Example 79 is an edge computing system configured to implement any of the examples of 1-50 with use cases provided from one or more of: compute offload, data caching, video processing, network function virtualization, radio access network management, augmented reality, virtual reality, autonomous driving, vehicle assistance, vehicle communications, industrial automation, retail services, manufacturing operations, smart buildings, energy management, internet of things operations, object detection, speech recognition, healthcare applications, gaming applications, or accelerated content processing.

Example 80 is an edge computing system, comprising computing nodes operated by multiple owners at different geographic locations, configured to implement any of the examples of 1-50.

Example 81 is a cloud computing system, comprising data servers operating respective cloud services, the respective cloud services configured to coordinate with an edge computing system to implement any of the examples of 1-50.

Example 82 is a server, comprising hardware to operate cloudlet, edgelet, or applet services, the services configured to coordinate with an edge computing system to implement any of the examples of 1-50.

Example 83 is an edge node in an edge computing system, comprising one or more devices with at least one processor and memory to implement any of the examples of 1-50.

Example 84 is an edge node in an edge computing system, the edge node operating one or more services provided from among: a management console service, a telemetry service, a provisioning service, an application or service orchestration service, a virtual machine service, a container service, a function deployment service, or a compute deployment service, or an acceleration management service, the one or more services configured to implement any of the examples of 1-50.

Example 85 is a set of distributed edge nodes, distributed among a network layer of an edge computing system, the network layer comprising a close edge, local edge, enterprise edge, on-premise edge, near edge, middle, edge, or far edge network layer, configured to implement any of the examples of 1-50.

Example 86 is an apparatus of an edge computing system comprising: one or more processors and one or more computer-readable media comprising instructions that, when executed by the one or more processors, cause the one or more processors to perform any of the examples of 1-50.

Example 87 is one or more computer-readable storage media comprising instructions to cause an electronic device of an edge computing system, upon execution of the instructions by one or more processors of the electronic device, to perform any of the examples of 1-50.

Example 88 is a communication signal communicated in an edge computing system, to perform any of the examples of 1-50.

Example 89 is a data structure communicated in an edge computing system, the data structure comprising a datagram, packet, frame, segment, protocol data unit (PDU), or message, to perform any of the examples of 1-50.

Example 90 is a signal communicated in an edge computing system, the signal encoded with a datagram, packet, frame, segment, protocol data unit (PDU), message, or data to perform any of the examples of 1-50.

Example 91 is an electromagnetic signal communicated in an edge computing system, the electromagnetic signal carrying computer-readable instructions, wherein execution of the computer-readable instructions by one or more processors causes the one or more processors to perform any of the examples of 1-50.

Example 92 is a computer program used in an edge computing system, the computer program comprising instructions, wherein execution of the program by a processing element in the edge computing system is to cause the processing element to perform any of the examples of 1-50.

Example 93 is an apparatus of an edge computing system comprising means to perform any of the examples of 1-50.

Example 94 is an apparatus of an edge computing system comprising logic, modules, or circuitry to perform any of the examples of 1-50.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A node in an edge network, comprising:
   a processor; and
   memory to store instructions, which when executed by the processor, cause the node to:
   access a service level agreement related to a workload, the workload to be orchestrated for a user equipment by the node;
   modify an implementation of a machine learning model based on the service level agreement;
   implement the machine learning model to identify resource requirements to execute the workload in a manner to satisfy the service level agreement;
   initiate resource assignments from a resource provider, the resource assignments to satisfy the resource requirements;
   construct a resource hierarchy from the resource assignments;
   initiate execution of the workload using resources from the resource hierarchy; and
   monitor and adapt execution of the workload based on the resource hierarchy in response to the execution of the workload.

2. The node of claim 1, wherein the instructions to modify the implementation of the machine learning model cause the node to:
   access user preferences; and
   apply weights to inputs for the machine learning model to fit resource costs to the user preferences.

3. The node of claim 2, wherein the user preferences are stored in a spider diagram.

4. The node of claim 1, wherein the instructions to modify the implementation of the machine learning model cause the node to:
   evaluate trusted computing capabilities of nodes that host resources; and
   use the evaluated trusted computing capabilities of nodes in a cost function to identify resource requirements to execute the workload in a manner to satisfy the service level agreement.

5. The node of claim 1, wherein to evaluate trusted computing capabilities, the node is to:
   receive attestation from a node, the attestation indicating that the node is capable of trusted computing operations.

6. The node of claim 1, wherein the instructions to initiate resource assignments from the resource provider cause the node to:
   implement a cost function to identify resources for the resource assignments, the cost function based on a latency map, a storage hierarchy, a computation map, or a resource redundancy depth.

7. The node of claim 1, wherein the instructions to construct the resource hierarchy cause the node to:
   construct a primary resource map including resources to be used initially to begin execution the workload; and
   construct a resiliency resource map including resources that can be used when a resource from the primary resource map becomes unavailable, unresponsive, or fails;
   wherein the primary resource map and the resiliency resource map are integrated into the resource hierarchy.

8. The node of claim 1, wherein the instructions to construct the resource hierarchy cause the node to:
   construct the resource hierarchy using a latency-based metric of each of the resources from the resource assignments.

9. The node of claim 1, wherein the instructions to construct the resource hierarchy cause the node to:
   implement a cost function to construct the resource hierarchy, the cost function used to weigh a plurality of properties including:

resource response time, resource availability, resource durability, resource resiliency, resource consistency, or resource integrity.

10. The node of claim 9, wherein the cost function is weighted based on user preferences, administrator policies, client policies, or the service level agreement.

11. The node of claim 10, wherein the user preferences are represented in a spider diagram.

12. The node of claim 1, wherein the instructions to initiate execution of the workload cause the node to:
   initiate a portion of workload execution at the user equipment.

13. The node of claim 12, wherein the service level agreement includes an indication that the user equipment is available for use as a resource to execute the workload.

14. The node of claim 1, wherein the instructions to monitor and adapt execution of the workload cause the node to:
   migrate the execution of the workload from resources provided by a first resource provider to resources provided by a second resource provider.

15. The node of claim 1, wherein the instructions to monitor and adapt execution of the workload cause the node to:
   migrate orchestration of the workload from a first resource management controller to a second resource management controller, where the second resource management controller has a closer latency-based measurement to the user equipment than the first resource management controller.

16. The node of claim 1, wherein the instructions to monitor and adapt execution of the workload cause the node to:
   measure resource usage of the execution of the workload; and
   adapt execution of the workload when the resource usage exceeds a threshold resource usage.

17. A method, comprising:
   accessing a service level agreement related to a workload, the workload to be orchestrated for a user equipment by a node in an edge network;
   modifying an implementation of a machine learning model based on the service level agreement;
   implementing the machine learning model to identify resource requirements to execute the workload in a manner to satisfy the service level agreement;
   initiating resource assignments from a resource provider, the resource assignments to satisfy the resource requirements;
   constructing a resource hierarchy from the resource assignments;
   initiating execution of the workload using resources from the resource hierarchy; and
   monitoring and adapt execution of the workload based on the resource hierarchy in response to the execution of the workload.

18. The method of claim 17, wherein modifying the implementation of the machine learning model comprises:
   evaluating trusted computing capabilities of nodes that host resources; and
   using the evaluated trusted computing capabilities of nodes in a cost function to identify resource requirements to execute the workload in a manner to satisfy the service level agreement.

19. The method of claim 17, wherein evaluating trusted computing capabilities comprises:
   receiving attestation from a node, the attestation indicating that the node is capable of trusted computing operations.

20. The method of claim 17, wherein initiating resource assignments from the resource provider comprises:
   implementing a cost function to identify resources for the resource assignments, the cost function based on a latency map, a storage hierarchy, a computation map, or a resource redundancy depth.

21. The method of claim 17, wherein constructing the resource hierarchy comprises:
   constructing a primary resource map including resources to be used initially to begin execution the workload; and
   constructing a resiliency resource map including resources that can be used when a resource from the primary resource map becomes unavailable, unresponsive, or fails;
   wherein the primary resource map and the resiliency resource map are integrated into the resource hierarchy.

22. The method of claim 17, wherein constructing the resource hierarchy comprises:
   constructing the resource hierarchy using a latency-based metric of each of the resources from the resource assignments.

23. At least one machine-readable medium including instructions, which when executed by a node, cause the node to:
   access a service level agreement related to a workload, the workload to be orchestrated for a user equipment by the node;
   modify an implementation of a machine learning model based on the service level agreement;
   implement the machine learning model to identify resource requirements to execute the workload in a manner to satisfy the service level agreement;
   initiate resource assignments from a resource provider, the resource assignments to satisfy the resource requirements;
   construct a resource hierarchy from the resource assignments;
   orchestrate execution of the workload using resources from the resource hierarchy; and
   monitor and adapt execution of the workload based on the resource hierarchy in response to the execution of the workload.

24. The at least one machine-readable medium of claim 23, wherein the instructions to monitor and adapt execution of the workload cause the node to:
   migrate the execution of the workload from resources provided by a first resource provider to resources provided by a second resource provider.

25. The at least one machine-readable medium of claim 23, wherein the instructions to monitor and adapt execution of the workload cause the node to:
   migrate orchestration of the workload from a first resource management controller to a second resource management controller, where the second resource management controller has a closer latency-based measurement to the user equipment than the first resource management controller.

* * * * *